United States Patent
Milam et al.

(10) Patent No.: US 8,658,116 B2
(45) Date of Patent: Feb. 25, 2014

(54) METHOD OF PRODUCING SULFUR DIOXIDE

(71) Applicant: Shell Oil Company, Houston, TX (US)

(72) Inventors: Stanley Nemec Milam, Houston, TX (US); Ann Marie Lauritzen, Houston, TX (US); Michael Anthony Reynolds, Katy, TX (US); Eswarachandra Kumar Paruchuri, Richmond, TX (US); Scott Lee Wellington, Bellaire, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 13/678,104

(22) Filed: Nov. 15, 2012

(65) Prior Publication Data

US 2013/0123556 A1    May 16, 2013

Related U.S. Application Data (60) Provisional application No. 61/559,841, filed on Nov. 15, 2011.

(51) Int. Cl.
*C01B 17/50* (2006.01)
*C01B 17/52* (2006.01)
*C01B 17/74* (2006.01)
*C10L 3/10* (2006.01)

(52) U.S. Cl.
USPC .......... 423/224; 423/539; 423/542; 48/127.3; 48/127.5; 48/127.7; 208/208 R (58) Field of Classification Search
USPC .......... 48/127.3, 127.5, 127.7; 423/224, 539, 423/542; 208/208 R; 166/279
See application file for complete search history.

(56) References Cited

U.S. PATENT DOCUMENTS

| | | | |
|---|---|---|---|
| 4,171,347 A | 10/1979 | Hass | |
| 4,419,337 A * | 12/1983 | Jagodzinski et al. | 423/574.1 |
| 4,563,202 A | 1/1986 | Yao et al. | |
| 5,092,121 A | 3/1992 | Ahmer et al. | |
| 5,486,345 A * | 1/1996 | Watson | 423/573.1 |
| 5,520,249 A | 5/1996 | Minkkinen et al. | |
| 6,099,819 A | 8/2000 | Srinivas et al. | |
| 6,289,988 B1 * | 9/2001 | Myers et al. | 166/267 |
| 6,383,261 B2 * | 5/2002 | Myers et al. | 95/235 |
| 6,482,316 B1 * | 11/2002 | Bal | 208/299 |
| 6,616,908 B2 | 9/2003 | Watson et al. | |
| 7,311,891 B2 | 12/2007 | Dolan et al. | |
| 7,780,933 B2 * | 8/2010 | Kikkawa et al. | 423/220 |
| 7,841,407 B2 | 11/2010 | Wellington et al. | |
| 2003/0094366 A1 | 5/2003 | Inaba et al. | |
| 2003/0194366 A1 | 10/2003 | Srinivas et al. | |
| 2011/0185633 A1 | 8/2011 | Betting et al. | |

FOREIGN PATENT DOCUMENTS

| | | |
|---|---|---|
| WO | 2011124326 | 10/2011 |
| WO | WO-2011124326 | 10/2011 |

* cited by examiner

*Primary Examiner* — Timothy Vanoy (57) ABSTRACT

A method of producing sulfur dioxide is provided. A feed gas stream comprising at least 5% by volume hydrogen sulfide is provided. The feed gas stream is separated into a hydrogen sulfide stream and a hydrocarbon gas stream. An oxidant stream is provided and is combusted with the hydrogen sulfide stream to produce thermal power and a combustion stream containing sulfur dioxide and steam. Sulfur dioxide is separated from the combustion stream.

13 Claims, 4 Drawing Sheets

METHOD OF PRODUCING SULFUR DIOXIDE

The present application claims the benefit of U.S. Patent Application No. 61/559,841, filed Nov. 15, 2011, the entire disclosure of which is hereby incorporated by reference.

FIELD OF THE INVENTION

The present invention relates to a method of producing sulfur dioxide. In particular, the present invention relates to methods for processing feed streams containing hydrogen sulfide from subsurface hydrocarbon formations to produce sulfur dioxide and thermal power.

BACKGROUND OF THE INVENTION

Hydrocarbons obtained from subsurface formations are often used as energy resources, as feedstocks, and as consumer products. Concerns over depletion of available hydrocarbon resources have led to development of processes for more efficient recovery, processing, and/or use of available hydrocarbon resources.

In conventional processes, fluids obtained from a subsurface hydrocarbon formation may include water and gases and/or other liquids. If the fluids obtained from a hydrocarbon subsurface formation contain a mixture of gases and liquids, the gases may be separated from the liquids. In instances where hydrocarbon gases are predominately produced from the subsurface formation, the hydrocarbon gases may be processed to remove impurities and/or inert gases to make fuel (for example, natural gas and/or pipeline gas). Conventional processing of the subsurface formation gases may include treatment with a regenerative chemical extraction system such as an amine extraction system to capture hydrogen sulfide and/or carbon dioxide from the subsurface formation gases and produce a hydrocarbon gas stream. The hydrocarbon gas stream may be further processed to produce natural gas.

Most commonly, hydrogen sulfide captured from subsurface formation gases is converted to elemental sulfur using a Claus process. The Claus process may be represented by the following equation: $2H_2S+O_2 \rightarrow 2S+2H_2O$. Using the Claus process to treat hydrogen sulfide captured from subsurface formation gases that contain a significant amount of hydrogen sulfide produces a significant amount of elemental sulfur. The potential uses for the generated sulfur, however, are limited and/or conversion of hydrogen sulfide to the elemental sulfur may be economically disadvantageous. The Claus process may generate some power, however, the amount of power generated may be insufficient to operate the processing systems used to capture hydrogen sulfide from the subsurface formation gases and to produce natural gas from the resulting hydrocarbon gas stream; thus supplemental power is required from other sources. A portion of the natural gas produced by the process and/or another fuel source are commonly used as fuel for generation of the required supplemental power.

Some sources of supplemental power are obtained by combusting a sulfur treatment process tail gas containing small amounts of sulfur compounds. For example, U.S. Pat. No. 5,092,121 to Ahner et al. describes a process for generating electricity by combusting a combustion fuel containing sulfur in a gas turbine. A sulfur treatment process tail gas containing carbon dioxide and sulfur-containing compounds is combusted in combination with a purified fuel gas stream in the combustor of a gas turbine or a supplemental firing unit to combust the sulfur-containing compounds. While more energetically efficient than the Claus process in the production of electrical power, the process is still relatively inefficient, and burning of the fuel may result in emission of carbon dioxide and sulfur dioxide to the environment.

Other methods for treating hydrocarbon gas streams containing hydrogen sulfide and/or carbon dioxide separate the hydrogen sulfide and/or carbon dioxide from the hydrocarbon gas stream and inject the hydrogen sulfide and/or carbon dioxide into a subsurface formation. These methods require power for separation, compression, and pumping of the hydrogen sulfide and carbon dioxide into the subsurface formation. The fuel for generating the power is generally supplied by burning a portion of the natural gas produced from the hydrocarbon gas stream and/or other fuel sources. Burning of the fuel is inefficient and may result in emission of carbon dioxide to the environment.

As outlined above, methods for treating hydrocarbon gas streams that contain hydrogen sulfide are known, however, hydrocarbon gas streams having greater than 2% by volume hydrogen sulfide are not generally chosen for development due to numerous concerns including corrosion, environmental emissions management, energy requirements for processing, and/or large amounts of elemental sulfur produced from associated Claus processes. As such, efficient, cost effective methods for processing streams containing hydrocarbons and high amounts of hydrogen sulfide and/or combinations of hydrogen sulfide and carbon dioxide are desirable.

SUMMARY OF THE INVENTION

The present invention is directed to a method of producing sulfur dioxide comprising:

providing a feed gas stream comprising hydrogen sulfide and hydrocarbons, wherein the feed gas stream comprises at least 5% by volume hydrogen sulfide;

separating at least a portion of the feed gas stream into a hydrogen sulfide stream and a hydrocarbon gas stream, the hydrogen sulfide stream containing more hydrogen sulfide, by volume percent, than the feed gas stream, and the hydrocarbon gas stream containing less hydrogen sulfide, by volume percent, than the feed gas stream;

providing an oxidant stream;

combusting at least a portion of the hydrogen sulfide stream with at least a portion of the oxidant stream to generate thermal power and to produce a combustion stream comprising sulfur dioxide and steam; and separating at least a portion of the sulfur dioxide from the combustion stream.

BRIEF DESCRIPTION OF THE DRAWINGS

Further advantages of the present invention may become apparent to those skilled in the art with the benefit of the following detailed description of the preferred embodiments and upon reference to the accompanying drawings in which.

DETAILED DESCRIPTION

The present invention describes methods for utilization of gas streams produced from a subsurface formation that comprises hydrogen sulfide and hydrocarbons. Such gas streams are referred to herein as "feed gas streams." A feed gas stream used in the process of the present invention comprises at least 5% by volume hydrogen sulfide. The invention described herein allows for the processing of feed gas streams from subsurface formations previously deemed not suitable for commercial development. Such feed gas streams contain at least 5%, or preferably at least 10%, or at least 20%, or at least 30%, or at least 50%, or at least 90% by volume hydrogen sulfide with the balance being hydrocarbons, other gases, and entrained liquids and particulates.

The invention also provides a method of treating a feed gas stream produced from a subsurface formation that includes hydrocarbons and a significant amount of both hydrogen sulfide and carbon dioxide. The feed gas stream may contain at least 5%, or at least 10%, or at least 20%, or at least 30%, or at least 50%, or at least 75%, up to 95% hydrogen sulfide, by volume, and from 2% up to 50%, or up to 40%, or up to 30%, or up to 20%, or up to 10%, or up to 5% carbon dioxide by volume. In some embodiments, at least 60%, or at least 70%, or at least 90% of the total volume of hydrogen sulfide and carbon dioxide in the feed gas stream may be hydrogen sulfide, and at most 40%, or at most 30%, or at most 20%, or at most 10% of the total volume of hydrogen sulfide and carbon dioxide in the feed gas stream may be carbon dioxide. In some embodiments, the feed gas stream contains at least 1%, or at least 5%, or at least 10%, or at least 25%, or at least 50%, and at most 90%, or at most 70% or at most 50% or at most 10% by volume hydrocarbons, with the balance being a mixture of hydrogen sulfide, carbon dioxide, inert gases including nitrogen and helium, and entrained liquids and particulates.

This invention provides methods of using feed gas streams that contain hydrocarbons and at least 5% by volume hydrogen sulfide to produce thermal power and sulfur dioxide by processing such a feed gas stream to produce a hydrogen sulfide stream and a hydrocarbon gas stream and combusting the hydrogen sulfide stream. In some embodiments, the feed gas stream comprises at least 5% by volume hydrogen sulfide and at least 2% by volume carbon dioxide with the balance being hydrocarbons and small amounts of impurities such as carbon oxides other than carbon dioxide, metals, particulates, and inert gases.

At least a portion of the hydrocarbon gas stream separated from the feed gas stream is processed to produce natural gas, compressed natural gas, and/or liquefied natural gas ("LNG"). Preferably all (100% by volume) of the hydrocarbon gas stream is processed to produce natural gas, compressed natural gas, or LNG, however, a portion of the hydrocarbon gas stream may be utilized for other purposes so that only a portion of the hydrocarbon gas stream is processed to produce natural gas, compressed natural gas, or LNG. Preferably at least 25%, or at least 50%, or at least 75%, or at least 80%, or at least 90%, or at least 95%, by volume, of the hydrocarbon gas stream may be processed to produce natural gas, compressed natural gas, or LNG. At least 90%, or at least 95%, or at least 99% of the produced natural gas, compressed natural gas, or liquefied natural gas may be transported to one or more facilities for storage, further processing, and/or distribution.

As used herein "natural gas" refers to a mixture of hydrocarbons having a carbon number ranging from 1 to 6 ("$C_1$-$C_6$ hydrocarbons") containing more $C_1$ hydrocarbons (methane) than the total amount of $C_2$-$C_6$ hydrocarbons. Hydrocarbons having a carbon number from 1 to 6 include, but are not limited to, methane, ethane, propane, butanes, pentanes, and hexanes. Natural gas, as used herein, may comprise above 50%, or at least 70%, or at least 90% by volume methane. As used herein, "compressed natural gas" refers to natural gas that has been compressed to less than 1% of its volume (at standard atmospheric pressure), and has a pressure of 13.8 MPa to 27.6 MPa (2000-4000 psi). As used herein "LNG" refers to a liquefied natural gas containing at least 90% methane, preferably at least 95% methane, and more preferably at least 99% methane.

As used herein, "processing the hydrocarbon gas stream to produce natural gas" includes one or more of the steps of 1) dehydrating the hydrocarbon gas stream; 2) removing metals from the hydrocarbon gas stream; and 3) separating non-hydrocarbon gases (e.g. nitrogen, helium, carbon oxides, and trace hydrogen sulfide) from the hydrocarbon gas stream to produce a natural gas. Compressed natural gas may be formed from the natural gas by processing the natural gas with at least the additional step of 4) compressing the natural gas. As used herein, the term "processing the hydrocarbon gas stream to produce compressed natural gas" includes the steps of processing the hydrocarbon gas stream to produce natural gas with at least the additional step of compressing the natural gas. Liquefied natural gas (LNG) may be formed from the compressed natural gas by processing the compressed natural gas with at least the additional steps of 5) separating at least a portion of hydrocarbons having a carbon number of from 2 to 6 ($C_2$-$C_6$) from the compressed natural gas to form a methane-rich gas; and 6) liquefying the methane rich gas. The term "processing the hydrocarbon gas stream to produce liquefied natural gas (LNG)" includes the steps of processing the hydrocarbon gas stream to produce a natural gas or a compressed natural gas with at least the additional steps of separating at least a portion of hydrocarbons having a carbon number of from 2 to 6 ($C_2$-$C_6$) from the natural gas or compressed natural gas to form a methane-rich gas and liquefying the methane-rich gas. In an embodiment, processing the hydrocarbon gas stream to produce LNG includes the steps of 1) dehydrating the hydrocarbon gas stream; 2) removing metals from the hydrocarbon gas stream; 3) separating non-hydrocarbon gases (e.g. nitrogen, helium, carbon oxides, and trace hydrogen sulfide) from the hydrocarbon gas stream to produce a natural gas; 4) compressing the natural gas; 5) separating at least a portion of hydrocarbons having a carbon number of from 2 to 6 ($C_2$-$C_6$ hydrocarbons) from the natural gas or from the compressed natural gas to produce a methane-rich gas; and 6) liquefying the methane-rich gas.

The units for separation processes and further processing of the hydrocarbon gas stream to form natural gas, compressed natural gas, or LNG require thermal, mechanical and/or electrical power. The present invention provides a method in which a hydrogen sulfide stream or a portion thereof is combusted to generate at least 50%, or at least 75%, or at least 90%, or all of the power required for separating the feed gas stream into the hydrogen sulfide stream and the hydrocarbon gas stream and for processing at least a portion of, or all, the hydrocarbon gas stream into natural gas, compressed natural gas, or LNG. The power required for separating the feed gas stream into the hydrogen sulfide stream and the hydrocarbon gas stream and for processing the hydrocarbon gas stream into natural gas, compressed natural gas, or LNG may include thermal power, mechanical power, electrical power, or combinations thereof.

At least a portion of the hydrogen sulfide stream is combusted to generate thermal power and a combustion stream. In a preferred embodiment, combustion of at least a portion of the hydrogen sulfide stream is performed in the presence of a stoichiometric excess of oxidant relative to the molar amount of hydrogen sulfide in the hydrogen sulfide stream. As used herein, a "stoichiometric excess of oxidant relative to the molar amount of hydrogen sulfide" refers to an amount of oxidant sufficient to fully oxidize the hydrogen sulfide to sulfur dioxide and water, e.g. an amount of oxidant sufficient to provide at least 1.5 moles of molecular oxygen per 1 mole of hydrogen sulfide. As used herein, "oxidant" refers to a composition that may be combusted with hydrogen sulfide as a fuel source. Examples of oxidants include oxygen, oxygen admixed with steam, oxygen admixed with carbon dioxide, air, and/or enriched air. "Enriched air" refers to air having an oxygen content greater than about 21 percent by volume. Enriched air may be used to increase, relative to air, the combustion temperature of the hydrogen sulfide stream at a constant fuel input rate and/or to facilitate post combustion processing of the combustion effluent gases.

Substantially all of the thermal power generated from combustion of the hydrogen sulfide stream and the oxidant may be captured as steam, e.g. at least 80%, or at least 85%, or at least 90%, up to 95%, or up to 97%, or up to 99%, or up to 100% of the thermal power generated from combustion may be captured as steam. Thermal power captured as steam may be utilized to provide thermal power, and/or utilized to make mechanical power and/or electrical power. At least a portion of the captured steam is utilized to provide or generate all of the power (thermal, mechanical, and/or electrical) required for separating the feed gas stream into the hydrogen sulfide stream and the hydrocarbon gas stream and/or for processing the hydrocarbon gas stream to form natural gas, compressed natural gas, or LNG, and, optionally to compress any carbon dioxide present in the combustion effluent gas stream or separated from the feed gas stream.

The thermal power generated by combustion of the hydrogen sulfide stream or a portion thereof may be captured as steam having a selected temperature and/or pressure profile. All or substantially all of the thermal power from combustion of the hydrogen sulfide stream may be used to generate steam at pressures ranging from 0.34 MPa to 34.5 MPa, or from 3.4 MPa to 34.5 MPa, or from 13.8 MPa to 34.5 MPa, or from 22.2 MPa to 34.5 MPa; or from 30 MPa to 34.5 MPa; and temperatures ranging from 135° C. to 650° C., or from 240° C. to 650° C., or from 335° C. to 650° C., or from 375° C. to 650° C.

The produced steam may be saturated steam, superheated steam, supercritical steam or ultra supercritical steam based on the requirements of systems selected to separate the feed gas stream into the hydrogen sulfide stream and the hydrocarbon gas stream and/or to process the hydrocarbon gas stream into natural gas, compressed natural gas, or LNG, as well as the requirements of systems selected to produce energy for export. As used herein, "saturated steam" is defined as steam in equilibrium with liquid water; "superheated steam" is defined as steam at a temperature higher than water's boiling point at a selected pressure; "supercritical steam" is defined as steam having a temperature of at least 374° C. and a pressure of at least 22.15 MPa, and "ultra supercritical steam" is defined as steam having a temperature of at least 374° C. and a pressure of at least 30 MPa. Selection of the type of steam to be generated may depend on the units that require mechanical and/or thermal and/or electrical power. For example, low pressure saturated steam may be preferred to provide thermal power to a regenerative chemical unit reboiler used in the separation of the hydrogen sulfide stream and the hydrocarbon gas stream from the feed gas stream. Higher pressure saturated and/or superheated steam may be preferred to produce mechanical power to drive equipment for purification and/or compression of natural gas while very high pressure supercritical and/or ultra supercritical steam may be used for the production of electrical power using a steam turbine. For example, superheated steam, e.g. supercritical steam or ultra supercritical steam, may be converted to mechanical power by expansion through a steam expansion device (for example, a steam turboexpander or a steam turbine). The mechanical power (shaft power) may be used to drive rotating equipment such as gas compressors, pumps and electric generators.

Although it is known that combusting hydrogen sulfide releases energy ($\Delta H_{rxn}$=−124 kcal/mol at 600° K), it was unexpectedly found that when using hydrogen sulfide as fuel for generation of thermal power for the production of natural gas or compressed natural gas from a feed gas stream comprising hydrocarbons and at least 5% by volume of hydrogen sulfide that at least 0.01 kWh of excess thermal power per kilogram of hydrogen sulfide is generated relative to the amount of energy required to separate the feed gas stream into a hydrogen sulfide stream and a hydrocarbon gas stream and to process the hydrocarbon gas stream to produce natural gas, or a compressed natural gas. It was also found that when using hydrogen sulfide as fuel for generation of thermal power for the production of LNG from a feed gas stream comprising hydrocarbons and at least 10% by volume hydrogen sulfide that at least 0.01 kWh of excess thermal power per kilogram of hydrogen sulfide is generated relative to the amount of energy required to separate the feed gas stream into a hydrogen sulfide stream and a hydrocarbon gas stream and to process the hydrocarbon gas stream to produce LNG.

In some embodiments of the invention, thermal power is generated in such excess relative to the power requirements for separating the feed stream and for further processing of the hydrocarbon gas stream to produce natural gas, compressed natural gas, or LNG that the excess thermal power may be converted to electrical power which may be exported, for example, to power distribution grids, industrial electric smelters, and/or server farms. The thermal power generated by combustion of the hydrogen sulfide stream is produced at a ratio of at least 200 MW per 10 million metric tons of natural gas produced from the feed stream. The thermal power generated by combustion of the hydrogen sulfide stream may be produced at a ratio of least 300 MW, or at least 400 MW, or at least 500 MW, or at least 1000 MW per 10 million metric tons of natural gas produced from the feed gas stream.

In some embodiments, at least 0.01 kilowatt hours (kWh), at least 0.5 kWh, or at least 1 kWh or at least 1.5 kWh of thermal power per kilogram of hydrogen sulfide in the hydrocarbon feed gas stream are generated in excess of the amount of all the mechanical, thermal, and electrical power required to separate the feed gas stream into the hydrogen sulfide stream and the hydrocarbon gas stream and to process the resulting hydrocarbon gas stream to produce natural gas, compressed natural gas, or LNG, and, optionally, to compress carbon dioxide separated from the feed gas stream or a combustion stream produced by combustion of the hydrogen sulfide stream. The amount of excess power that may be generated from the feed gas stream is proportional to the amount of hydrogen sulfide in the feed gas stream, provided the entire hydrogen sulfide stream separated from the feed gas stream is combusted. As the hydrogen sulfide content in the feed gas stream increases, substantial amounts of excess thermal power may be generated by combustion of a hydrogen sulfide stream separated from the feed gas stream. For example, 1 kWh of excess thermal power per kilogram of hydrogen sulfide in the feed gas stream is generated over and above all of the power required to produce liquefied natural gas from the feed gas stream when the feed gas stream comprises 20 vol. % hydrogen sulfide. In some embodiments, a feed gas stream containing at least 10% by volume hydrogen sulfide may be utilized to generate at least 0.1 kWh of excess thermal power per kg of hydrogen sulfide in the feed gas stream. For a feed gas stream containing at least 50% by volume hydrogen sulfide, at least 1.5 kWh of excess thermal power may be generated per kg of hydrogen sulfide in the feed gas stream. For a feed gas stream containing at least 90% by volume hydrogen sulfide, at least 1.6 kWh of excess thermal power may be generated per kg of hydrogen sulfide in the feed gas stream.

Excess thermal power generated from the combustion of hydrogen sulfide from a feed gas stream containing hydrocarbons and at least 5% by volume hydrogen sulfide, after generating all the power to separate the feed gas stream into a hydrocarbon gas stream and a hydrogen sulfide stream and to process the hydrocarbon gas stream to make 10 million metric tons per calendar year of natural gas, may range from at least 0.01 MW thermal power ("MWt") to 80000 MWt, or from 200 MWt to 75000 MWt or from 300 MWt to 70000 MWt, or from 400 MWt to 65000 MWt, or from 500 MWt to 60000 MWt.

In embodiments where the feed gas stream contains hydrocarbons and a significant amount of hydrogen sulfide and carbon dioxide, after generating all the power to separate the feed gas stream into a hydrogen sulfide stream and a hydrocarbon gas stream and to process the hydrocarbon gas stream to make natural gas, at least 0.1 kWh, at least 0.5 kWh, or at least 0.8 kWh of excess thermal power per kilogram of hydrogen sulfide in the feed gas stream may be generated. In some embodiments, feed gas streams containing hydrocarbons and at least 10% by total volume of hydrogen sulfide and carbon dioxide, where at least 5% of the total volume is hydrogen sulfide, may generate from 50 MWt to 40000 MWt, or from 100 MWt to 30000 MWt or from 200 MWt to 20000 MWt of excess thermal power after generating all the power for processing the hydrocarbon gas stream to make 10 million metric tons per calendar year of natural gas, Since the feed gas stream has a high hydrogen sulfide content which provides at least sufficient power for processing the feed gas stream, substantially none, or none, of the hydrocarbons separated from the feed gas stream are used as fuel to generate power that is used to separate the feed gas stream into the hydrocarbon gas stream and the hydrogen sulfide stream and to process the hydrocarbon gas stream to produce natural gas, compressed natural gas, or LNG. For example, in the process of the present invention 0 vol. %, or from greater than 0 vol. % to at most 0.1 vol. %, or at most 0.5 vol. %, or at most 1 vol. %, or at most 2 vol. %, or at most 5 vol. % of the hydrocarbon gas stream separated from the feed gas stream, or a natural gas or compressed natural gas produced from the hydrocarbon gas stream, is used as fuel to generate power that is used to separate the feed gas stream into the hydrocarbon gas stream and the hydrogen sulfide stream and to process the hydrocarbon gas stream into natural gas, compressed natural gas, or LNG.

In comparison, conventional processes for producing natural gas, compressed natural gas, or LNG from hydrocarbon feed gas streams containing significant amounts of hydrogen sulfide, or hydrogen sulfide and carbon dioxide—wherein elemental sulfur is produced by application of the Claus process to hydrogen sulfide separated from a hydrocarbon feed gas stream—require combustion of supplemental fuel to meet the overall mechanical and/or thermal and/or electrical power requirements of the process. Such supplemental fuel is generally supplied from the natural gas or compressed natural gas produced by the process. Combustion of the natural gas or compressed natural gas as supplemental fuel leads to significant additional production of carbon dioxide over and above the carbon dioxide production from the Claus Process, and utilizes a portion of the natural gas or compressed natural gas product of the process to drive the process. Carbon dioxide produced in a conventional process may be emitted into the atmosphere or specific steps that require additional energy and equipment must be taken to capture the produced carbon dioxide.

Use of the hydrogen sulfide stream as fuel in accordance with the process of the present invention instead of a hydrocarbon fuel enables commercially practical recovery of hydrocarbons from sour hydrocarbon-containing gas subsurface formations containing significant quantities of hydrogen sulfide. Conventionally, the amount of power required to separate hydrogen sulfide from a sour hydrocarbon feed gas stream has provided a practical commercial limit on recovery of sour hydrocarbon feed gases from subsurface formations—sour hydrocarbon feed gases requiring more energy to separate hydrogen sulfide from the feed gas than chemical energy contained in the resulting natural gas product are not recovered since more energy is required to conduct the process than is produced by the process. Thus, previously undesirable feed gas streams that contain hydrocarbons and at least 5 vol. % hydrogen sulfide may be produced from subsurface formations and used as a source of commercial products (for example natural gas, compressed natural gas, liquefied natural gas, liquefied carbon dioxide and sulfur dioxide) because the hydrogen sulfide produced from the feed gas stream is used as the primary or only fuel source for generation of all the power required to operate the hydrocarbon feed gas treatment system.

Furthermore, the use of hydrogen sulfide as fuel in the process of the present invention provides a method to consume hydrogen sulfide from other processes (for example, sour gas associated with oil production and/or hydrogen sulfide produced as a by-product stream from refining operations such as hydrotreating) without creating elemental sulfur. The use of a hydrogen sulfide stream as fuel may allow from 0.3 moles to 1 mole of methane to be recovered rather than being used as fuel per mole of atomic sulfur in the feed gas stream.

The process of the present invention also provides a method that generates a minimal amount of, or substantially no, carbon dioxide while generating power. Combustion of at least a portion of the hydrogen sulfide stream to generate power generates at most 0.1 grams of carbon dioxide per gram of hydrocarbons in the feed gas stream, and may generate from greater than 0 grams to at most 0.1 grams, or to at most 0.05 grams, or to at most 0.01 grams of carbon dioxide per gram of hydrocarbons in the feed gas stream. Since the hydrogen sulfide stream is used as fuel instead of the hydrocarbons from the hydrocarbon gas stream and/or hydrocarbons from other sources, production of carbon dioxide is avoided relative to processes that utilize hydrocarbons as fuel. For example, combustion of methane produces carbon dioxide as a by-product, as shown by the following reaction: $CH_4 + 2O_2 \rightarrow CO_2 + 2H_2O$. In contrast, combustion of hydrogen sulfide generates sulfur dioxide and water, as shown by the following reaction: $H_2S + 1.5O_2 \rightarrow SO_2 + H_2O$.

When the feed gas stream contains a high amount of carbon dioxide and hydrogen sulfide, for example at least 2 vol. % carbon dioxide and at least 5 vol. % hydrogen sulfide, the carbon dioxide may be separated from the hydrogen sulfide prior to combustion of the hydrogen sulfide stream, and, thereafter, may be sold as a commercial product. In an embodiment, the carbon dioxide may be separated from hydrogen sulfide by temperature differential separation and/or pressure differential separation after the carbon dioxide and the hydrogen sulfide have been separated from feed gas stream. For example, carbon dioxide and hydrogen sulfide may be separated from the feed gas stream by scrubbing the feed gas stream with an amine solvent, and carbon dioxide may be separated from the amine solvent separately from the hydrogen sulfide by treating the amine solvent containing the carbon dioxide and hydrogen sulfide at a temperature and pressure at which carbon dioxide, but not hydrogen sulfide, is released from the amine solvent. The amine solvent may then be treated in a second step at a second temperature and pressure at which hydrogen sulfide is released from the solvent.

In some embodiments, when the feed gas stream contains at least 5 vol. % hydrogen sulfide and at least 2 vol. % carbon dioxide, the carbon dioxide may be separated and co-fed to the combustor with the hydrogen sulfide stream and/or the hydrogen sulfide stream containing carbon dioxide may be fed to the combustor to produce a combustion stream containing carbon dioxide and sulfur dioxide. The carbon dioxide and sulfur dioxide in the combustion stream may be separated and sold as one or more commercial products. At least a portion of the carbon dioxide and sulfur dioxide products may be sequestered either individually or together in a subsurface geological formation.

An oxidant stream may be provided for combustion with the hydrogen sulfide stream. The oxidant stream may be provided in an amount such that at least 90%, or at least 95%, or all of the hydrogen sulfide in the hydrogen sulfide stream is combusted to form sulfur dioxide and water. The oxidant stream may be provided in an amount relative to the amount of hydrogen sulfide in the hydrogen sulfide stream such that the oxidant stream contains at least 1.5 moles of molecular oxygen per 1 mole of hydrogen sulfide in the hydrogen sulfide stream.

Combustion of the hydrogen sulfide stream in the presence of a stoichiometric excess of oxidant relative to the molar amount of hydrogen sulfide produces a combustion stream comprising sulfur dioxide and water. The resulting sulfur dioxide may be converted to commercial products such as, for example, sulfuric acid. In some embodiments, sulfur dioxide produced by the combustion of the hydrogen sulfide stream is used to facilitate recovery of hydrocarbons from a subsurface formation. Water resulting from combustion of the hydrogen sulfide stream may be used in other processing units, stored, or transported to other processing facilities.

Figure 1:
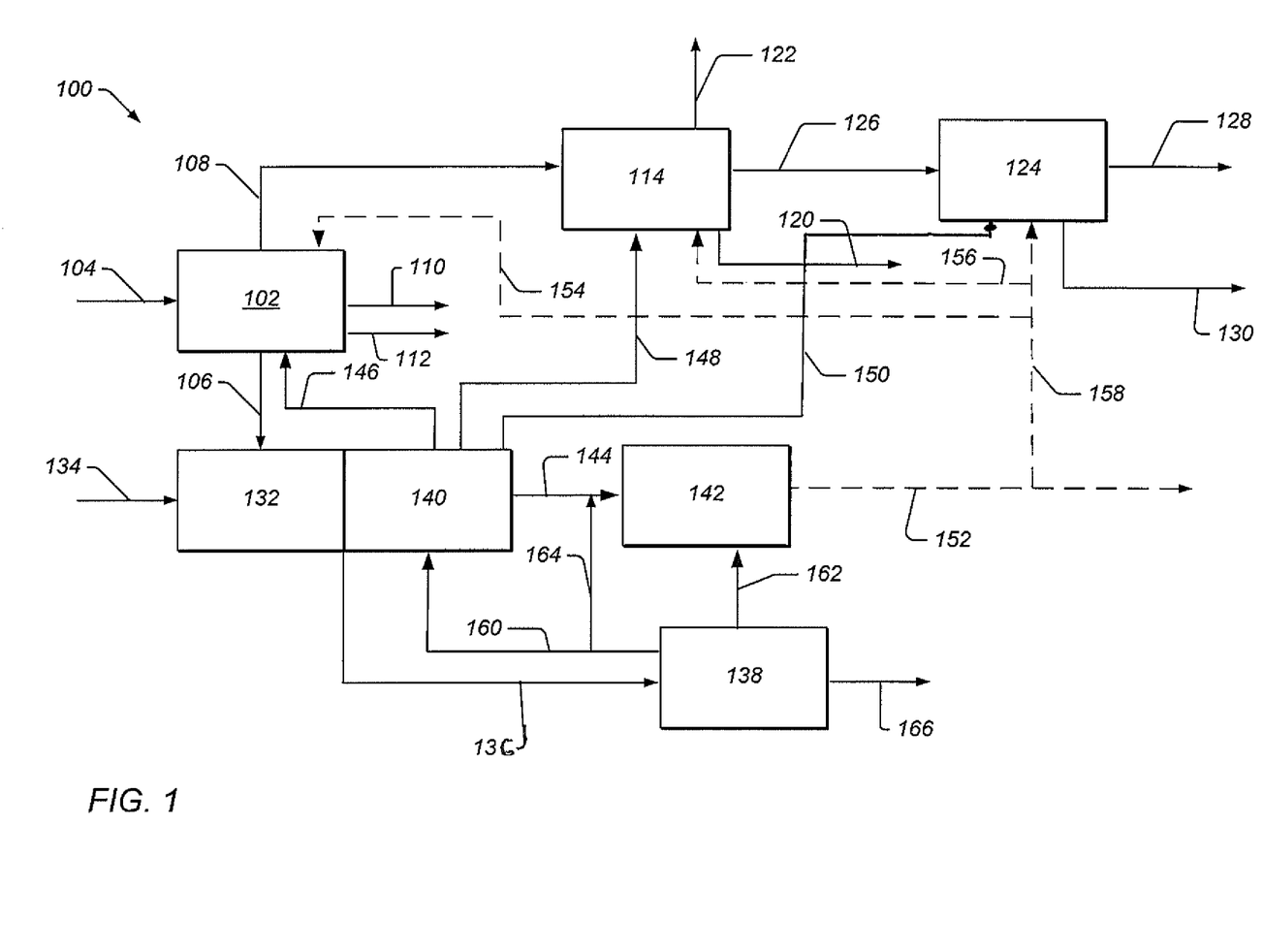
FIG. 1 depicts a schematic of an embodiment of a system for treating a feed gas stream high in hydrogen sulfide to produce electrical power and/or sulfur dioxide.

FIG. 1 depicts a schematic representation of a system for treatment of a feed gas stream that includes hydrocarbons and at least 5% by volume of hydrogen sulfide to produce natural gas, compressed natural gas, liquefied natural gas, liquefied carbon dioxide, sulfur dioxide, power, or combinations thereof. The feed gas stream may be produced from a subsurface formation. In some embodiments, the feed gas stream includes organosulfur compounds. Examples of organosulfur compounds include, but are not limited to, mercaptans, sulfides, carbon disulfide, carbonyl sulfide, or mixtures thereof. Examples of mercaptans include, but are not limited to, methanethiol and benzene thiol. Examples of sulfides include, but are not limited to, diethyl sulfide, cyclic sulfides, tetrahydrothiophene, and thiophene compounds.

The feed gas stream comprises at least 5%, or at least 10%, or at least 20%, or at least 25%, or at least 30% up to 99.9%, or up to 95%, or up to 90%, or up to 80%, or up to 75%, or up to 60% by volume hydrogen sulfide. The volume percent of hydrogen sulfide in the feed gas stream may range from 5 to up to 99.9, from 20 to 90, or from 30 to 80. In some embodiments, the feed gas stream comprises at least 5%, or at least 10%, at least 20%, or at least 50% or at least 60% by volume hydrogen sulfide and at least 2%, or at least 5%, or at least 10% or at least 20% or at least 30% by volume carbon dioxide. The feed gas stream contains at most 95%, or at most 90%, or at most 70% or at most 50% or at most 10% and at least 0.1%, or at least 1%, or at least 5% or at least 10% by volume hydrocarbons.

In system 100 of FIG. 1, the feed gas stream 104 enters feed gas separation unit 102. In feed gas separation unit 102, the feed gas stream 104 is separated into a hydrogen sulfide stream 106, a hydrocarbon gas stream 108, a water stream 110 and/or a stream of hydrocarbons 112 that are condensable at 25° C. and 0.101 MPa (hereinafter "liquid hydrocarbons"). In an embodiment, when carbon dioxide is present, the hydrogen sulfide stream 106 separated from the feed gas stream 102 may also contain carbon dioxide. Optionally, when the feed gas stream contains at least 2 vol. % carbon dioxide, the feed gas stream may be separated into a hydrogen sulfide stream 106, a hydrocarbon gas stream 108, and a carbon dioxide stream by separating hydrogen sulfide and carbon dioxide from the feed gas stream and separating the hydrogen sulfide and carbon dioxide into a hydrogen sulfide stream and a carbon dioxide stream, respectively. The hydrogen sulfide stream 106, optionally containing carbon dioxide, contains more hydrogen sulfide, and, optionally more carbon dioxide, by volume percent, than the feed gas stream 104, and the hydrocarbon gas stream 108 contains less hydrogen sulfide, and, optionally less carbon dioxide, by volume percent, than the feed gas stream 104.

Feed gas separation unit 102 may include one or more physical treatment systems and/or one or more chemical treatment systems. A physical treatment system may be, but is not limited to, a coalescing unit, a cyclone separator unit, an electrostatic precipitator unit, a fixed bed adsorption unit, a filter, a heat exchanger, a membrane unit, a pressure swing adsorption unit, and/or a temperature separation unit. A chemical treatment system may be an absorption unit. The chemical treatment system may be regenerative such that the chemical treatment system may adsorb or react with target components in the feed gas stream such as hydrogen sulfide and carbon dioxide to remove the target components from the feed gas stream and the target components may subsequently be released from the chemical treatment system after separation from the feed gas stream, for example, by the application of thermal power (heat) to the chemical treatment system. Compositions used in a chemical treatment unit may solvate target components of the feed gas stream, complex target components of the feed gas stream, and/or react with target components of the feed gas stream 104, where the target components include hydrogen sulfide and may include other sulfur containing compounds and carbon dioxide. In a preferred embodiment, the chemical treatment system is a regenerative chemical treatment system effective to solvate, complex, or react with one or more target components of the feed gas stream 104 to separate the target components from the feed gas stream 104, and from which the target components may subsequently be separated. Separation unit 102 may include one or more units that consume thermal power and/or mechanical power and/or electrical power or combinations thereof for operation (for example, pumps, compressors, and other motor driven devices).

Separation unit 102 may include steam boilers and/or regenerative chemical treatment system reboilers. The water for the steam boilers and/or reboilers may be heated by the thermal power generated through combustion of the hydrogen sulfide stream 106. In some embodiments, the steam captured (thermal power) from combustion of the hydrogen sulfide stream 106 is used to generate low pressure steam for separation unit 102.

When feed gas separation unit 102 is a regenerative chemical treatment system, the feed gas stream 104 is contacted with a composition that absorbs, solvates, complexes, or reacts with at least a majority of the hydrogen sulfide to form a composition or compound that contains the hydrogen sulfide or a composition or adduct formed by reaction of hydrogen sulfide with the contacting composition. If carbon dioxide is present in the feed gas stream 104, the composition may also solvate, complex, or react with at least a majority of the carbon dioxide in the feed gas stream to form a composition or compound that contains the carbon dioxide or a composition or adduct formed by reaction of carbon dioxide with the contacting composition.

The composition containing the hydrogen sulfide, and optionally carbon dioxide, and/or a complex, composition or adduct formed from the hydrogen sulfide and optionally carbon dioxide is regenerated after separation from contact with the feed gas stream 104 to regenerate the contacting composition and produce the hydrogen sulfide stream 106. Regeneration may be effected by application of thermal power to release the hydrogen sulfide stream 106 containing hydrogen sulfide, and carbon dioxide if present. The thermal power may be provided as steam. All of the thermal power necessary for regeneration of the composition for contact with the feed gas stream 104 may be provided by combustion of the hydrogen sulfide gas stream 106.

In an embodiment of the process of the present invention, when the feed gas stream 104 contains both hydrogen sulfide and carbon dioxide, the composition containing hydrogen sulfide and carbon dioxide, and/or a complex, composition, or adduct formed from hydrogen sulfide and/or carbon dioxide, may be regenerated so that carbon dioxide and hydrogen sulfide may be recovered separately. As noted above, carbon dioxide may be recovered separately from the hydrogen sulfide stream by temperature and/or pressure differential separation from the composition containing the hydrogen sulfide and carbon dioxide, and/or a complex, composition, or adduct formed therefrom. The carbon dioxide may be recovered separately from the hydrogen sulfide stream as a carbon dioxide stream. Alternatively, hydrogen sulfide and carbon dioxide may be recovered together from the composition to form the hydrogen sulfide stream 106.

The composition used in the chemical treatment system for contacting the feed gas stream 104 may be a liquid, solid and/or any material that may separate hydrogen sulfide, and optionally carbon dioxide, from the feed gas stream 104 and that may be regenerated to release hydrogen sulfide and carbon dioxide (if present in the feed gas stream 104). Such compositions include, but are not limited to, amines, sulfolane, water, methanol, ethylene glycol, diethylene glycol, triethylene glycol, n-methyl-2-pyrrolidinone, propylene carbonate, dimethyl ethers of polyethylene glycol, a mixture of compounds of general formula $CH_3O-(C_2H_4O)_nCH_3$ where n is an integer from about 2 to 9, liquid hydrocarbons, or mixtures thereof.

In certain embodiments, the gas separation unit 102 includes a regenerative amine treatment unit. Examples of amines used in a regenerative amine treatment unit include, but are not limited to, monoethanolamine, diethanolamine, triethanolamine, methyldiethanolamine, 2-(2-aminoethoxy)-ethanol, or di-isopropanolamine Examples of commercial chemical regenerative treatment processes that may be used in the process of the invention include, but are not limited to, a Sulfinol gas treatment process, a Selexol (UOP™, Des Planes, Ill., USA) gas treatment process, a Rectisol® Process (Lurgi GmbH, Frankfurt Germany) and/or a Rectisol Wash Process (Linde Engineering, Germany).

The feed gas stream 104 may be treated in two or more separation processes in the feed gas separation unit 102 and/or may be recycled one or more times through a single separation process in the feed gas separation unit 102 to produce a hydrocarbon gas stream 108 with acceptable limits of hydrogen sulfide and acceptable limits of carbon dioxide for further treatment of the hydrocarbon gas stream 108 to provide a natural gas stream suitable for sale as a pipeline gas or for conversion into a compressed natural gas or a liquefied natural gas.

The hydrocarbon gas stream 108 may be fed to a separation unit 114. The separation unit 114 may include one or more physical treatment systems, including but not limited to, a coalescing unit, a cyclone separator unit, an electrostatic precipitator unit, a fixed bed adsorption unit, a filter, a heat exchanger, a dehydration unit, a membrane unit, a pressure swing adsorption unit, a temperature separation unit; and/or one or more a chemical treatment units. In separation unit 114, water, metals, trace amounts of carbon oxides, trace amounts of hydrogen sulfide, heavier hydrocarbons (e.g. $C_5$-$C_{10}$ hydrocarbons) and/or inert gases may be separated from the hydrocarbon gas stream 108 to form a natural gas stream 122 and/or a hydrocarbon containing stream suitable for sale as pipeline gas. "Carbon oxides," refers to compounds having carbon and oxygen bonds. Examples of carbon oxides include, but are not limited to, carbon dioxide, carbon monoxide, carbonyl sulfide or mixtures thereof.

For example, water may be removed from the hydrocarbon gas stream 108 by passing the stream through a glycol dehydration system, a pressure swing adsorption unit, and/or a solid desiccant system. Metals (for example, mercury), if present, may be removed by contacting the dried hydrocarbon gas stream with molecular sieves and/or activated carbon to remove a portion or substantially all of the metals from the hydrocarbon gas stream. In some embodiments, the metal content of the hydrocarbon gas stream 108 may be sufficiently low that removal of metals is not necessary. Heavier hydrocarbons may be condensed from the hydrocarbon gas stream 108 by cooling the hydrocarbon gas stream 108 to a temperature below the dew point of such hydrocarbons, for example, in a heat exchanger.

The hydrocarbon gas stream 108 may be passed through a series of cryogenic units and/or absorption units to remove inert gases, for example nitrogen, and/or carbon oxides from the hydrocarbon gas stream. Residual carbon dioxide may be removed using the Catacarb® and/or Benfield gas treatment processes. The adsorption units and/or cryogenic units are, in some embodiments, a rectified adsorption and high pressure fractionation unit. In some embodiments, separation unit 114 includes a chemical treatment unit to remove trace amounts of hydrogen sulfide from the hydrocarbon gas stream 108. The trace amount of hydrogen sulfide removed from the hydrocarbon gas stream 108 in separation unit 114 may be combined with the hydrogen sulfide stream 106 exiting gas separation unit 102.

In some embodiments, the natural gas or pipeline gas stream 122 contains at most 50 ppm or at most 30 ppm or at most 10 ppm of hydrogen sulfide. Hydrogen sulfide content in the natural gas or pipeline gas stream 122 may be measured using ASTM Method D4804. The natural or pipeline gas stream 122 contains less hydrogen sulfide, by volume percent, than the feed gas stream 104.

In some embodiments, the hydrocarbon gas stream 108 is processed to separate hydrocarbons having a carbon number from 2 to 6 ($C_{2-6}$ hydrocarbons) from the hydrocarbon gas stream to form the natural gas or pipeline gas stream 122 and a natural gas liquids stream 120. The hydrocarbon gas stream 108 may be processed in the separation unit 114 to separate $C_{2-6}$ hydrocarbons from the hydrocarbon gas stream by compressing the hydrocarbon gas stream 108, cooling the compressed hydrocarbon gas stream, and expanding the compressed cooled hydrocarbon gas stream to separate $C_{2-6}$ hydrocarbons from the hydrocarbon gas stream and produce natural gas. For example, the hydrocarbon gas stream may be passed through a turboexpander/demethanizer system to produce a natural gas stream and a $C_{2-6}$ hydrocarbon stream. The natural gas stream 122 produced from a turboexpander/demethanizer system may contain at least 50%, at least 70%, or at least 95% methane.

The natural gas stream 122 preferably has a pressure of at least 1.7 MPa (250 psig), where the pressure of the natural gas stream 122 may be derived from the pressure of the feed gas stream 104 from a subsurface formation. If the pressure of the natural gas stream 122 is less than 1.7 MPa then the natural gas stream may be compressed with a compressor to a pressure of at least 1.7 MPa to produce a pipelineable natural gas stream.

In some embodiments, the hydrocarbon gas stream 108 may be passed through a gas/liquid extraction system in the separation unit 114. In a gas/liquid extraction system the hydrocarbon gas stream 108 is contacted with an absorbing composition. The absorbing composition separates natural gas liquids from the hydrocarbon gas stream 108 to form natural gas stream 122 and an absorbing composition/$C_{2-6}$ hydrocarbon stream 120. In some embodiments, the absorbing composition may be an oil, and the absorbing oil/$C_{2-6}$ hydrocarbon stream 120 may be distilled to produce ethane, propane, butane, pentane and/or hexane streams.

At least a portion of the natural gas produced in the separation unit 114 may be provided for further processing in a facility 124 as natural gas stream 126. Preferably the natural gas stream 126 has a pressure of at least 1.7 MPa, where the pressure may be derived from the pressure of the feed gas stream 104 from a subsurface formation or the natural gas stream may be compressed to a pressure of at least 1.7 MPa if the pressure of the natural gas stream 126 exiting the separation unit 114 is less than 1.7 MPa. In some embodiments, at least 99% of the natural gas exiting hydrocarbon separation unit 114 is provided as a natural gas stream 126 for further processing in the facility 124.

The facility 124 includes one or more systems for processing the natural gas stream 126, and may include a compression/liquefaction system. In a compression/liquefaction system, the natural gas stream 126 may be compressed without liquefaction to produce compressed natural gas 130 or with liquefaction to produce liquid natural gas 128.

The natural gas stream 126 may be compressed using known compression methods. For example, the natural gas stream 126 may be compressed under isothermal, adiabatic, or polytrophic conditions. The natural gas stream 126 may be passed through one or more compressors. The compressors may be positive displacement and/or dynamic compressors. Examples of compressors include, but are not limited to, reciprocating, rotary, centrifugal and/or axial.

In a compression/liquefaction system in the facility 124, a compressed natural gas stream formed from the natural gas stream 126 may be further compressed and cooled through use of heat exchange and/or expansion to a temperature of below about $-160°$ C., or below about $-165°$ C., preferably to about $-162°$ C. to form liquefied natural gas 128. Examples of commercially available natural gas liquefaction systems and processes include, but are not limited to, the Air Products AP-X™ system the Shell DMR process, and the ConocoPhillips Cascade® process. The compressed natural gas 130 and/or liquefied natural gas 128 may be transported to other processing units and/or storage units.

The hydrogen sulfide stream 106 is provided from the feed gas separation unit 102 to the combustion unit 132. The hydrogen sulfide stream may contain at most 1% by volume, at most 0.1% by volume, or at most 0.01% by volume hydrocarbons including organosulfur species including mercaptans. The hydrogen sulfide stream 106 may include from above 0% to 40% by volume, from 1% to 30% by volume, or from 5% to 20% by volume carbon dioxide. In some embodiments, elemental sulfur may be combined with the hydrogen sulfide stream and/or provided to combustion unit 132.

An oxidant stream 134 is provided to the combustion unit 132 for combustion with the hydrogen sulfide stream 106. An oxygen enriched oxidant stream such as oxygen or enriched air is preferred when the hydrogen sulfide stream 106 comprises significant quantities of carbon dioxide. Air is a preferred oxidant stream when the hydrogen sulfide stream 106 is substantially free of carbon dioxide.

In the combustion unit 132, at least a portion of the hydrogen sulfide stream 106 is combusted with the oxidant stream 134. The hydrogen sulfide stream 106 and/or the oxidant stream 134 may be provided to the combustion unit 132 at elevated pressure, for example via a forced draft fan and/or a combination of forced draft and induced draft fans, to circulate the gas streams in the combustion unit. The temperature in combustion unit 132 may be controlled by controlling the flow rate of the oxidant stream 134 to the combustion unit 132, and/or the flow rate of the hydrogen sulfide stream 106 to the combustion unit 132, and/or by controlling the flow rate of a recycle stream of a combustion stream after recovery of thermal energy from the combusted gas. Combustion of at least a portion of the hydrogen sulfide stream 106 generates heat and a combustion stream formed of the combusted gas.

Combustion of at least a portion of the hydrogen sulfide stream 106 is preferably performed in the presence of a stoichiometric excess of oxidant relative to the molar amount of hydrogen sulfide. In embodiments when elemental sulfur is provided to combustion unit 132, the flow rate of the oxidant stream 134 may be adjusted to maintain a stoichiometric excess of oxidant relative to the total amount of hydrogen sulfide in the hydrogen sulfide stream 106 and elemental sulfur supplied to combustion unit 132 such that substantially all, or all, of the hydrogen sulfide and elemental sulfur is converted to sulfur dioxide and water in the combustion unit 132.

In some embodiments, the combustion stream resulting from the combustion of the hydrogen sulfide stream 106 includes a minimal amount or no hydrogen sulfide and a substantially equal molar mixture of sulfur dioxide and water as steam. The combustion stream may comprise 0%, or greater than 0% but less than 0.1%, or less than 0.05%, or less than 0.001% by volume of hydrogen sulfide. The combustion stream may include excess oxygen, one or more sulfur oxides, and steam, and may contain nitrogen if the oxidant stream is air or enriched air. The combustion of the hydrogen sulfide stream 106 generates 0 grams, or greater than 0 grams but at most 0.1 grams, or at most 0.01 grams, or at most 0.001 grams of carbon dioxide per gram of hydrocarbons in the feed gas stream 104. The combustion stream may also contain substantially all of the carbon dioxide separated from the feed gas stream, provided 1) that the feed gas stream contains carbon dioxide; and 2) that the carbon dioxide from the feed gas stream is not separated from the hydrogen sulfide from the feed gas stream prior to combusting the hydrogen sulfide stream.

The combustion stream is produced at a temperature ranging from 200° C. to 3000° C., or from 300° C. to 1500° C., or from 500° C. to 1000° C. Heat from the combustion stream is generated at a rate such that the thermal power captured from the heat of the combustion stream is sufficient to produce all of the power (thermal, mechanical, and/or electrical) necessary to operate all the processes and systems used in separation unit 102, separation unit 114, and compression/liquefaction unit 124. The thermal power captured from the heat of the combustion stream may be thermally and mechanically and electrically integrated with the processes used to produce natural gas and/or compressed natural gas and/or liquefied natural gas, and/or liquefied carbon dioxide and/or sulfur dioxide.

Thermal power captured from the heat of the combustion stream formed in the combustion unit 132 is captured in thermal power unit 140. Combustion unit 132 and thermal power unit 140 may be an integrated unit or separate units. In a preferred embodiment thermal power is captured as steam in the thermal power unit 140. Thermal power unit 140 may include one or more heat exchangers and/or one or more steam manufacture units such as a steam boiler.

The thermal power unit 140 may capture thermal power from the combustion stream as steam. All or substantially all of the thermal power from combustion of the hydrogen sulfide stream 106 is used to generate steam at pressures ranging from 0.34 MPa to 34.5 MPa, or from 3.4 MPa to 34.5 MPa, or from 13.8 MPa to 34.5 MPa, or from 22.2 MPa to 34.5 MPa, or from 30 MPa to 34.5 MPa; and temperatures ranging from 135° C. to 650° C., or from 240° C. to 650° C., or from 335° C. to 650° C., or from 375° C. to 650° C.

The thermal power unit 140 may be designed and utilized to produce steam of various grades, based on the temperature and pressure of the steam. Saturated steam, superheated steam, supercritical steam, and/or ultra supercritical steam may each be generated in separated sections of the thermal power unit 140.

At least a portion of the thermal power generated by combustion of the hydrogen sulfide stream may be converted to mechanical and/or electric power or may be provided to units in the system 100 as thermal power. The various grades of steam that may be produced in the thermal power unit 140 may be utilized to provide thermal power to the process and to generate mechanical and/or electrical power. Steam produced in the thermal power unit 140 from the heat of the combustion stream may be provided to a steam turbine unit 142 via conduit 144 for the generation of mechanical and/or electrical power, and/or to steam powered units in separation unit 102 via conduit 146, and/or to steam powered units in separation unit 114 via conduit 148, and/or and to steam powered units in compression/liquefaction unit 124 via conduit 150. Steam powered units include, but are not limited to, pumps in chemical treatment systems, natural gas compressors, carbon dioxide liquefaction compressors, refrigeration compressors, and electrical generators.

Low pressure saturated steam may be used to provide thermal power to re-boilers of chemical treatment systems of separation unit 102 and/or separation unit 114. High pressure saturated and/or superheated and/or supercritical steam may be used to provide mechanical power to equipment used in separation unit 102 and/or separation unit 114 and/or compression/liquefaction unit 124, for example by passing the high pressure saturated, and/or superheated and/or supercritical steam through a steam expansion device (i.e., a steam turboexpander or a steam turbine) to generate mechanical (shaft) power. Superheated steam, more preferably supercritical steam, and most preferably ultra supercritical steam may be utilized to generate electrical power, for example, by passing the steam through a steam expansion device (e.g. a steam turboexpander or a steam turbine) coupled with an electrical power generator.

In some embodiments, at least 75%, or at least 85%, or at least 90% of the thermal power produced by combusting the hydrogen sulfide stream 106 is used to make electrical power using steam turbines. Ultra supercritical or supercritical steam 146 may be provided to steam turbine unit 142. The ultra supercritical or supercritical steam may be used to drive electrical generators in steam turbine unit 142 to meet the electrical power requirements of separating the feed gas stream 104 into the hydrogen sulfide stream 106 and the hydrocarbon gas stream 108 and for processing the hydrocarbon gas stream 108 to produce natural gas, compressed natural gas, or LNG. The steam turbine unit 142 may convert thermal power from the ultra supercritical or supercritical steam 146 into all the electrical power necessary to process the hydrocarbon gas stream 108 and to separate the hydrogen sulfide stream 106 and the hydrocarbon gas stream 108 from the feed gas stream 104 (for example, all the electrical power required for the operation of separation unit 102, separation unit 114, and/or compression/liquefaction unit 124).

The steam turbine unit 142 may include one or more electrical generators and/or one or more steam turbines. Steam turbine unit 142 may be a multi-stage turbine (for example, a steam turbine may include at least one high-pressure stage, at least one medium pressure stage, at least one low pressure stage, or combinations thereof). In some embodiments, the steam turbine unit 142 is electrically integrated with the separation unit 102, the separation unit 114, and/or the compression/liquefaction unit 124. The steam turbine unit 142 may be electrically integrated with a power grid for export of electrical power to the power grid by electrical line 152.

In a preferred embodiment, all the thermal power from the combustion of the hydrogen sulfide stream 106 is captured as steam. Sufficient heat is provided to the thermal power unit 140 from the combustion of the hydrogen sulfide stream 106 such that the temperature of water in one or more boilers in the thermal power unit 140 is raised to make steam and/or maintain steam production. At least a portion of the steam may be used to generate all of the mechanical, electrical, and thermal power required for processes to produce natural gas, compressed natural gas, liquefied natural gas, and/or to operate other surface facility processes. The steam turbine unit 142 may provide electrical power to the processing units and/or separating units 102, 114 and 124 and/or may be exported via line 152. Electrical power may be supplied to separation unit 102 via electrical line 154, and/or to separation unit 114 via electrical line 156, and/or to compression/liquefaction unit 124 via line 158. The electrical power provided is sufficient: (a) for all of the electrical power required for separation of the feed gas stream (for example, for the operation of the feed gas separation unit 102 to separate the feed gas stream 104 into the hydrogen sulfide stream 106 and the hydrocarbon gas stream 108); (b) for the processing of the hydrocarbon gas stream 108 into natural gas, compressed natural gas, or LNG (for example, for the operation of the separation unit 114, and, optionally, the compression/liquefaction unit 124); and may be sufficient (c) for sale or use in other electrical power consumption units.

Other electrical power consumption units that may be powered by electrical power produced by the system 100 include, but are not limited to, power distribution grids, server farms, industrial electric smelters, or combinations thereof. In some embodiments, the other electrical power consumption units are located on or near a body of water. For example, server farms located on a floating or anchored platform on a body of water. Smelters may include, but are not limited to, aluminum smelters.

After thermal power has been captured from the heat of the combustion stream in the thermal power unit 140, a cooled combustion stream 136 may be provided from the thermal power unit 140 to a sulfur dioxide separator 138. In the sulfur dioxide separator 138 the cooled combustion stream 136 may be separated into a sulfur dioxide stream and a water stream and, if inert gases are present in the cooled combustion stream, an inert gas stream. Water may be separated from sulfur dioxide and the cooled combustion stream 136 in the sulfur dioxide separator 138 by adjusting the temperature and pressure of the cooled combustion stream 136 so that water condenses out of the cooled combustion stream. Sulfur dioxide may be separated from the cooled combustion stream 136 or a dehydrated cooled combustion stream by contacting the cooled combustion stream or dehydrated cooled combustion stream with concentrated sulfuric acid.

To separate water from the cooled combustion stream 136, the cooled combustion stream may be further cooled, and, if necessary, expanded to reduce the pressure of the combustion stream, within the sulfur dioxide separator 138 to a temperature and pressure at which water separates from the cooled combustion stream. For example, in the sulfur dioxide separator 138 the cooled combustion stream 136 may be further cooled to a temperature ranging from about −5° C. to about 85° C. and the pressure of the stream may be adjusted, if necessary, to a pressure of from 0.1 MPa to 0.2 MPa to separate water from sulfur dioxide and unreacted oxidant and inert gases.

The water produced in the sulfur dioxide separator 138 may be supplied to the thermal power unit 140 via conduit 160 for use in producing steam, and/or may be supplied directly to the steam turbine 142 via conduit 162, and/or may be mixed with steam from thermal power unit 140 in conduit 144 via conduit 164. In the sulfur dioxide separator 138, sulfur dioxide may be separated from the cooled combustion stream 136 or the dehydrated cooled combustion stream by contacting the stream with a material and/or compound that adsorbs at least a portion of the sulfur dioxide from the stream. The adsorbent may be treated to release the sulfur dioxide to form a purified sulfur dioxide stream. In some embodiments, the sulfur dioxide stream is separated from other components in the cooled combustion stream 136 (for example, inert gases, carbon oxides and/or water) by mixing the cooled combustion stream or the dehydrated cooled combustion stream with aqueous inorganic salt solutions, aqueous organic salt solutions, amines, aqueous alcohol solutions, ethers and/or poly glycol solutions. A commercially available sulfur dioxide separation system that may be utilized to separate sulfur dioxide from the cooled combustion stream 136 or the dehydrated cooled combustion stream is a Cansolv® $SO_2$ Scrubbing System (Cansolv Technologies, Montreal Canada).

The sulfur dioxide stream 166 separated from the cooled combustion stream 136 or the dehydrated cooled combustion stream may exit the sulfur dioxide separator 138 as a gas, a compressed gas and/or a liquid. The sulfur dioxide stream 166 may include sulfur dioxide and some sulfur trioxide. In some embodiments, the sulfur dioxide stream 166 contains at least 50% by volume, at least 80% by volume, or at least 99% by volume of sulfur dioxide. Sulfur dioxide content in a stream may be measured using ISO Method 7935. The sulfur dioxide stream 166 may be stored and/or combined with one or more streams to form a concentrated sulfur dioxide stream.

In some embodiments of the process of the present invention, the sulfur dioxide stream may be dried, compressed and/or liquefied. The sulfur dioxide stream 166 may be dried through contact of the sulfur dioxide stream 166 with concentrated sulfuric acid at 30° C. to form a dried sulfur dioxide stream. The dried sulfur dioxide stream may be compressed using a compressor working between 0.38 MPa and 0.5 MPa to form compressed sulfur dioxide. The compressed sulfur dioxide may be cooled to −30° C. to −60° C. to form a liquefied sulfur dioxide stream. The thermal power generated from combustion of the hydrogen sulfide stream 106 may be utilized to generate all of the thermal and/or electrical and/or mechanical power required to dry, compress and liquefy the sulfur dioxide stream 166 and all the thermal, and/or electrical, and/or mechanical power for the separation of the feed gas stream 104 into the hydrogen sulfide stream 106 and the hydrocarbon gas stream 108 and for the processing of the hydrocarbon gas stream 108.

In some embodiments, the sulfur dioxide in the sulfur dioxide stream 166 may be converted to sulfuric acid. Purification of sulfur dioxide and subsequent sulfuric acid production is described in U.S. Pat. Nos. 5,389,354 to Brandle et al.; 4,659,556 to Eros; 4,213,958 to Cameron et al.; and 3,475,120 to Mauer et al. The sulfuric acid may be made at the same facility as the production of natural gas, compressed natural gas, and/or liquefied natural gas or at a remote location. When the sulfuric acid is produced at the production facility for natural gas, compressed natural gas and/or liquefied natural gas, the thermal power generated by combustion of the hydrogen sulfide stream 106 is sufficient to generate all the necessary mechanical and/or electrical and/or thermal power required for producing the sulfuric acid and all the thermal and/or mechanical and/or electrical power for the separation of the feed gas stream 104 into the hydrogen sulfide stream 106 and the hydrocarbon gas stream 108 and for the processing of the hydrocarbon gas stream 108.

In some embodiments, carbon dioxide may be separated from the cooled combustion stream 136 or the dehydrated cooled combustion stream in the sulfur dioxide separator 138. The carbon dioxide in the cooled combustion stream 136 may be carbon dioxide that was present in the feed gas stream 104 and was carried through the process into the cooled combustion stream 136 and/or may be carbon dioxide formed by the combustion of hydrocarbons present in the hydrogen sulfide stream 106 (e.g. mercaptans and thiophenes). The separated carbon dioxide may be sequestered, treated, sold, introduced in a formation as a drive or displacement fluid and/or combined with other carbon oxides streams. The carbon dioxide may be compressed and/or liquefied, and then pumped into a hydrocarbon formation, a storage facility and/or a transportation unit.

Figure 2:
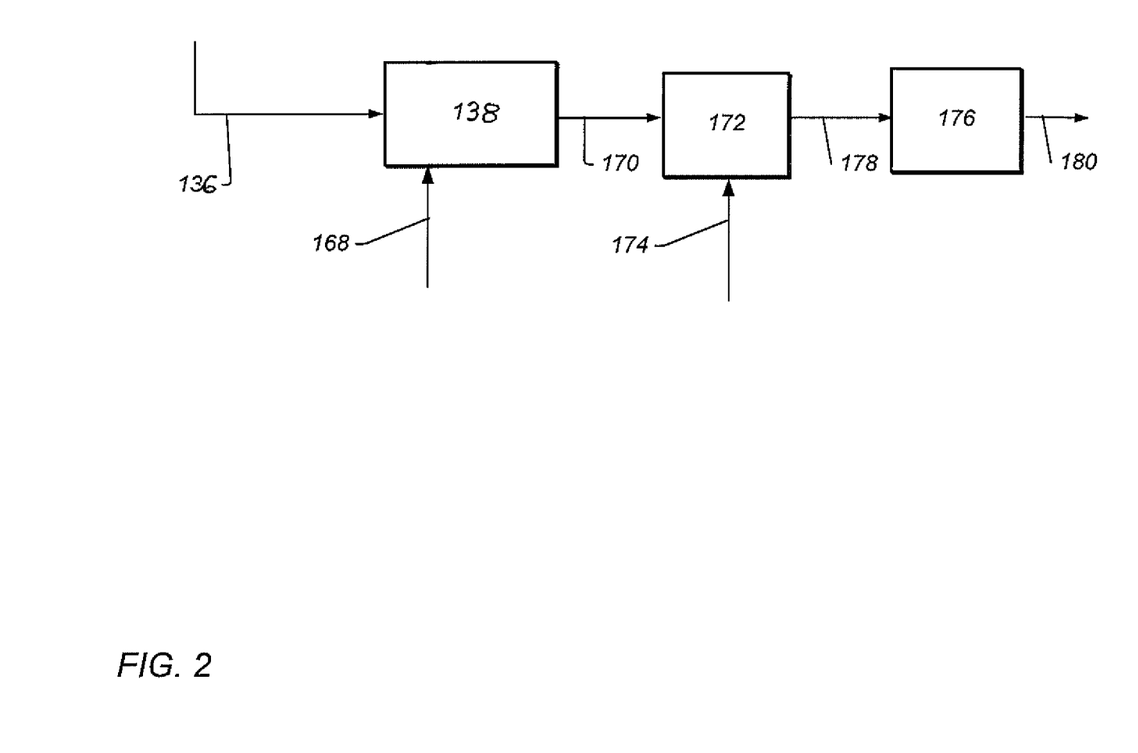
FIG. 2 depicts a schematic of an embodiment of production of sulfuric acid from a feed gas stream high in hydrogen sulfide.

FIG. 2 depicts a schematic representation of an embodiment of production of sulfuric acid from a feed gas stream high in hydrogen sulfide. In FIG. 2, the feed gas stream is treated as described in FIG. 1. In some embodiments, concentrated sulfuric acid (e.g. a 90% to 100% by weight sulfuric acid solution) is used as a separating composition to separate the sulfur dioxide from the cooled combustion stream 136. A concentrated sulfuric acid stream 168, or other separating composition, is provided to the sulfur dioxide separator 138 to be contacted with the cooled combustion stream 136. Water is adsorbed from the cooled combustion stream 136 by contacting the cooled combustion stream 136 with the concentrated sulfuric acid stream 168, producing a dehydrated cooled combustion stream 170. The dehydrated cooled combustion stream 170 may include sulfuric acid, sulfur dioxide, molecular oxygen, nitrogen and/or one or more nitrogen oxides, and may also include carbon dioxide. The dehydrated cooled combustion stream 170 exits sulfur dioxide separator 138 and enters oxidizing unit 172. In oxidizing unit 172, the dehydrated cooled combustion stream 170 is contacted with one or more catalysts to produce a sulfur trioxide stream. If sufficient molecular oxygen is not present in the dehydrated cooled combustion stream to oxidize the sulfur dioxide therein to form sulfur trioxide, a molecular oxygen stream 174 may be provided to the oxidizing unit 172. The one or more catalysts may include any catalyst that is effective to catalyze the oxidation of sulfur dioxide to sulfur trioxide, for example, a vanadium (V) oxide catalyst. The dehydrated cooled combustion stream may be contacted with the one or more oxidizing catalysts, and optionally the molecular oxygen stream 174, in the oxidizing unit 172 at temperatures ranging from 400° C. to 500° C. to effect the oxidation. The dehydrated cooled combustion stream 170 may be heated prior to being fed to the oxidizing unit 172.

A sulfur trioxide stream 178 produced in the oxidizing unit 172 exits the oxidizing unit 172 and enters an absorption unit 176. In the absorption unit 176, the sulfur trioxide stream 178 is contacted with sufficient water to hydrate the sulfur trioxide and thereby form a concentrated sulfuric acid solution (for example, 90 wt % to 100 wt % sulfuric acid solution). A concentrated sulfuric acid solution stream 180 exits absorption unit 176 for storage and/or transportation. In some embodiments, the sulfuric acid is suitable for use in the production of phosphoric acid.

To facilitate a better understanding of the present invention, the following examples of are provided. In no way should the following examples be read to limit, or define, the scope of the invention.

EXAMPLES

Examples 1 to 11

In a process model using process steps in accordance with the process of the present invention, power calculations for the production of 10 million metric tons of natural gas and subsequent liquefaction of the natural gas (LNG) from a feed gas stream containing hydrocarbons and having from 5% to 95% by volume hydrogen sulfide were performed using energy consumption data obtained from known refinery processes. In the process model, the feed gas stream was treated to separate water and liquid hydrocarbons from the feed gas stream. Next, hydrogen sulfide was removed from the feed gas stream using an amine extraction system. The power required to regenerate the hydrogen sulfide loaded amine system was supplied as steam produced in a boiler. The boiler was assumed to have 100% thermal efficiency. In the process model, the thermal power for the boiler was produced by burning the recovered hydrogen sulfide. The lower heating value of 6545 Btu per pound (15213 kilojoule per kilogram) of hydrogen sulfide was used in the calculations. The heating value for the regeneration of the hydrogen sulfide loaded amine extraction solution of 4030 Btu per pound (9374 kilojoule per kilogram) of hydrogen sulfide produced was used in the calculations. In the process model, if supplemental power was necessary, methane was used as fuel. In the calculations, the consumption of methane was estimated using the lower heating value of 21433 Btu per pound (49820 kilojoule per kilogram) of methane.

Figure 3:
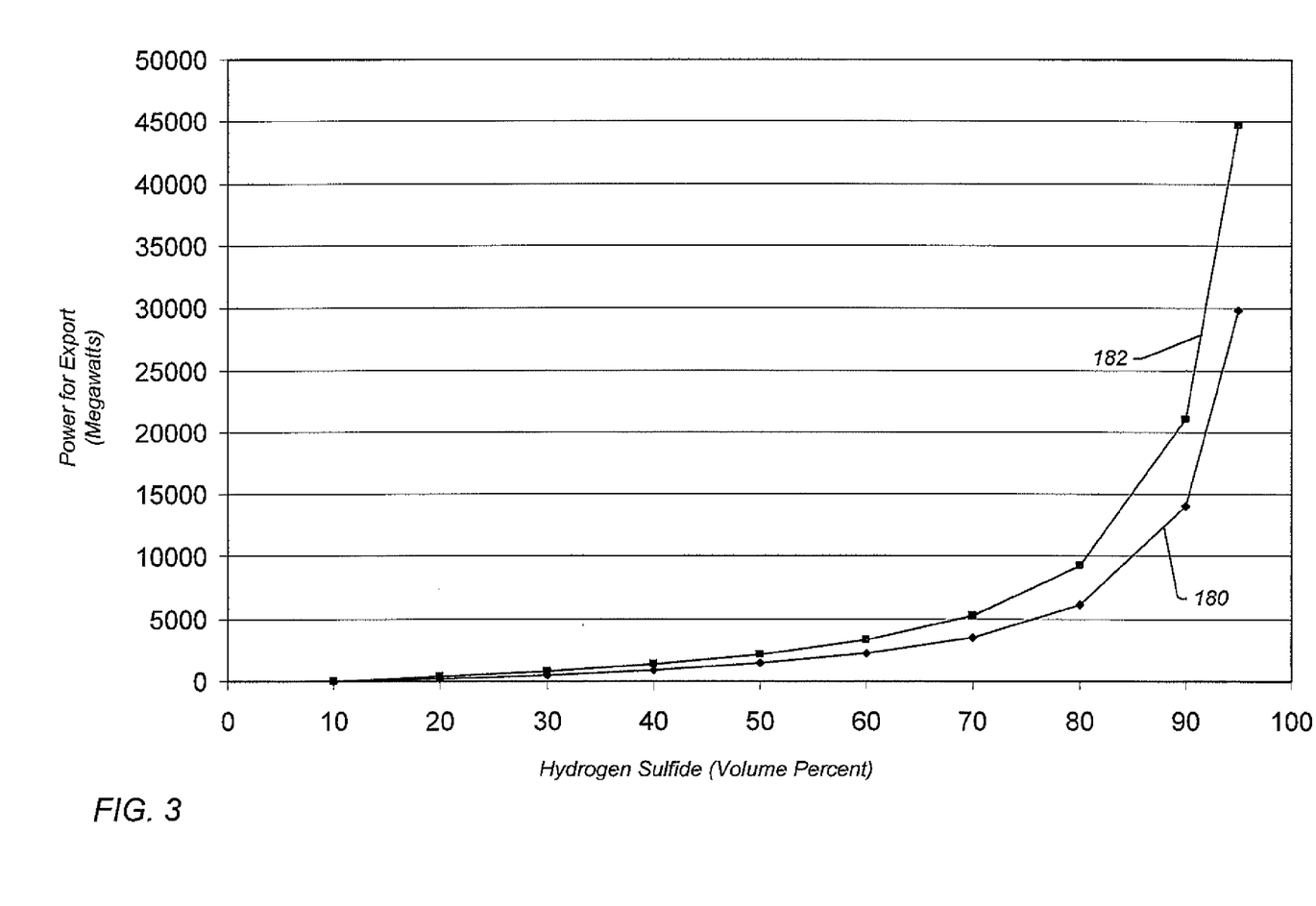
FIG. 3 depicts an example of a plot of power available for export, as electricity, in megawatts (MWe) versus volume percent of hydrogen sulfide content of a gas stream utilizing a process in accordance with the present invention.

TABLE 1 lists power data, LNG production data, sulfur dioxide production data, and carbon dioxide emission data from feed gas streams having from 5% to 95% by volume hydrogen sulfide. FIG. 3 depicts an example of a plot of the amount of power available for export (MW) versus hydrogen sulfide content during the production of LNG at a rate of 1142 mT/h (10 million metric ton of LNG per calendar year) for the feed stream compositions listed in TABLE 1. Data 180 represents electric power available for export at 40% thermal efficiency. Data 182 represents electric power available for export at 60% thermal efficiency.

Using the values in TABLE 1, the maximum amount of power generated when producing 10 million metric tons of natural gas per calendar year from feed gas streams having from 5% to 95% by volume hydrogen sulfide was calculated (power generated from burning $H_2S$ minus power consumed to separate $H_2S$) to be 207 MWt at 5%, 437 MWt at 10%, 984 MWt at 20%, 1687 MWt at 30%, 2624 MWt at 40%, 3936 MWt at 50%, 5905 MWt at 60%, 9185 MWt at 70%, 15746 MWt at 80%, 35428 MWt at 90% and 74793 MWt at 95% hydrogen sulfide. The amount of power generated when producing natural gas or compressed natural gas will be close to the maximum amount of power generated since little power, relative to the quantity of power generated, is required to dehydrate, demetallate, and separate non-hydrocarbon gases from the hydrocarbon stream separated from the feed gas stream, and to compress the natural gas to pipeline specifications. The amount of power generated when producing liquefied natural gas from 10 million metric tons of natural gas produced from feed gas streams having from 10% to 95% by volume hydrogen sulfide was calculated (power generated from burning $H_2S$ minus power consumed to separate $H_2S$ and power required to make LNG) to be 60 MW, at 10%, 607 MW, at 20%, 1309 MW, at 30%, 2247 MW, at 40%, 3559 MW, at 50%, 5527 MW, at 60%, 8808 MW, at 70%, 15368 MW, at 80%, 35051 MW, at 90%, and 74415 MW, at 95% hydrogen sulfide.

The data in Examples 1 to 11 demonstrate the production of sulfur dioxide from a feed gas stream containing at least 5 vol. % hydrogen sulfide by separation of a hydrogen sulfide stream from the feed gas stream, combustion of the hydrogen sulfide stream, and capture of the sulfur dioxide from the combustion stream. The data in Examples 1 to 11 also demonstrate generation of thermal power from combustion of a hydrogen sulfide stream, where the hydrogen sulfide stream is separated from a feed gas stream, where a hydrocarbon gas stream is also separated from the feed gas stream and the hydrocarbon gas stream is processed to produce natural gas, and where the thermal power is generated at a ratio of at least 200 MWt of thermal power per 10 million metric tons of natural gas produced. The data in Examples 1 to 11 also demonstrate utilizing at least a portion of the power generated from combustion of a hydrogen sulfide stream, produced from a feed gas stream having at least 5 vol % of hydrogen sulfide, to generate all of the power required for separating the feed gas stream into a hydrocarbon gas stream and the hydrogen sulfide stream and sufficient power for processing the hydrocarbon gas stream to produce LNG. Furthermore, the data in Examples 1 to 11 demonstrates that at least 0.01 kilowatt hours of thermal power per kg of hydrogen sulfide in the feed gas stream are produced in excess of that required to separate the feed gas stream into a hydrocarbon gas stream and a hydrogen sulfide stream and to process the hydrocarbon gas stream to produce LNG, and/or that at least 20 megawatts of electric power is available for export as electricity at a 40% efficiency while at most 0.1 grams of carbon dioxide per gram of hydrocarbons in the feed gas stream are produced during combustion of the hydrogen sulfide.

Comparative Examples 12 to 22

In a process model using process steps in accordance with the production of LNG using a conventional Claus process, power calculations for the production of 10 million metric tons of natural gas and subsequent liquefaction of the natural gas were performed using energy consumption data obtained from a known refinery process. In the process model, the feed gas stream was treated to separate water and liquid hydrocarbons from the feed gas stream. Next, hydrogen sulfide was removed from the feed gas stream using an amine extraction system. In the process model, the thermal power required to regenerate the hydrogen sulfide loaded amine system was supplied as steam produced from Claus Process heat recovery unit(s) and operation of a supplemental boiler that was fueled by natural gas produced in the process. The boiler was assumed to have 100% thermal efficiency. In the process model, hydrogen sulfide produced from regeneration of the amine system was converted to sulfur via the Claus Process. A heating value of 2973 Btu per pound (6915 kilojoule per kilogram) of sulfur produced from the Claus Process was used in the calculations. The heating value for the regeneration of the hydrogen sulfide loaded amine extraction solution of 4030 Btu per pound (9374 kilojoule per kilogram) of hydrogen sulfide produced was used in the calculations. In the process model, methane was used as fuel for generating supplemental power. The consumption of methane was estimated using the lower heating value of 21433 Btu per pound (49820 kilojoule per kilogram) of methane.

Figure 4:
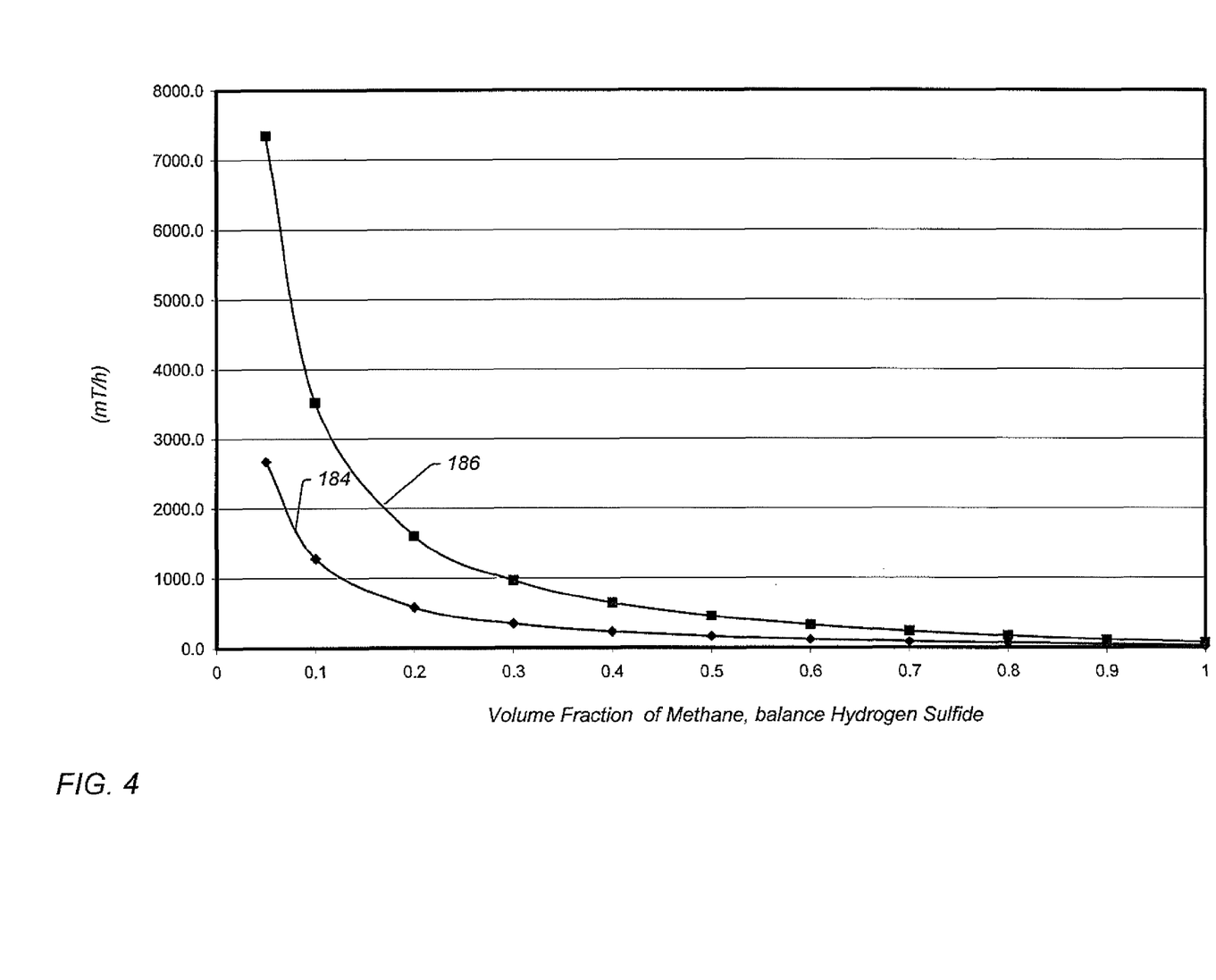
FIG. 4 depicts an example of a plot of methane consumed in metric tons per hour (mT/h) and carbon dioxide emitted in metric tons per hour (mT/h) versus volume fraction of methane, with the balance being hydrogen sulfide, for liquefaction of 10 million metric tons per calendar year of methane using a Claus process. While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, the invention is defined by the appended claims.

TABLE 2 lists power data, LNG production data, elemental sulfur production data, and carbon dioxide emission data for the production of LNG from feed gas streams containing at from 0% to 95% by volume hydrogen sulfide. FIG. 4 is a plot of methane consumed (mT/h) and carbon dioxide emitted (mT/h) versus volume fraction of methane with the balance being hydrogen sulfide during the production of LNG at a rate of 1142 mT/h (10 million metric ton of LNG per calendar year) for the feed stream compositions listed in TABLE 2. In FIG. 4, data 184 represents methane consumed in metric tons per hour (mT/h) sufficient to provide required supplemental power to operate the process, relative to the volume fraction of methane in the feed gas stream. Data 186 represents carbon dioxide emitted in metric tons per hour (mT/h) when supplemental methane is provided in an amount sufficient to provide required supplemental power to operate the process, relative to the volume fraction of methane in the feed gas stream. As shown in TABLE 2 and FIG. 4, the amount of methane fuel required for supplemental power for hydrogen sulfide separation and to produce LNG increases significantly as the amount of hydrogen sulfide in the feed stream increases. By comparing the data in Examples 1 to 11 to the data in Comparative Examples 12 to 22, it is shown that the use of hydrogen sulfide as fuel to power the separation of the feed gas stream into a hydrogen sulfide stream and a hydrocarbon gas stream and to process the hydrocarbon gas stream to form LNG yields more thermal power than is required by those process steps and permits production of electrical power for export as electricity. Conventional processes for producing LNG from feed gas streams containing significant amounts of hydrogen sulfide that utilize the Claus process to produce elemental sulfur from hydrogen sulfide, however, require supplemental combustion of methane and associated emission of carbon dioxide to meet the overall thermal and/or mechanical power requirements for the production of LNG.

Examples 23 to 33

In a process model using process steps in accordance with the present invention, power calculations for the production of 10 million metric tons of natural gas and subsequent liquefaction of the natural gas from a feed stream having from 0% to 63% by volume of hydrogen sulfide, from 0% to 32% by volume carbon dioxide, and from 100% to 5% by volume methane were performed using energy consumption data obtained from known refinery processes. In the process model, the feed gas stream was treated to separate water and liquid hydrocarbons from the feed gas stream. Next, hydrogen sulfide and carbon dioxide were removed from the feed gas stream using an amine extraction system. In the process model, the thermal power required to regenerate the hydrogen sulfide/carbon dioxide loaded amine system was supplied as steam produced in a boiler. The boiler was assumed to have 100% thermal efficiency. In the process model, the thermal energy for the boiler was produced by burning the recovered hydrogen sulfide. The lower heating value of 6545 Btu per pound (15213 kilojoule per kilogram) of hydrogen sulfide was used in the calculations. The heating value for the regeneration of the hydrogen loaded amine extraction solution of 4030 Btu per pound (9374 kilojoule per kilogram) of hydrogen sulfide produced was used in the calculations. The heating value for the regeneration of the carbon dioxide loaded amine extraction solution of 1513 btu per pound (1596 kilojoule per kilogram) of carbon dioxide, as described by Lars Erik Øi, in, "Aspen HYSYS Simulation of $CO_2$ Removal by Amine Absorption from a Gas Based Power Plant" SIMS2007 Conference, Gøteborg, Sweden, October 30 and 31, 2007, was used in the calculations. The power requirement for carbon dioxide compression, liquefaction, and pumping was estimated to be 0.11 MW per mT/h, as described by Baldwin et al. in "Capturing $CO_2$: Gas Compression vs. Liquefaction," Power, June 2009, electronic publication. In the process model, if supplemental power was necessary methane was used as fuel. The consumption of methane was estimated using the lower heating value of 21433 Btu per pound (49820 kilojoule per kilogram) of methane.

TABLE 3 lists power data, LNG production data, sulfur dioxide production data, and carbon dioxide emission data for the production of LNG from feed gas streams having compositions ranging from 0% to 63% by volume of hydrogen sulfide, from 0% to 32% by volume carbon dioxide, and from 100% to 5% by volume methane using hydrogen sulfide as a source of power.

Using the values in TABLE 3, the maximum amount of power generated when producing 10 million metric tons of natural gas per calendar year from feed gas streams having from 0% to 63% by volume of hydrogen sulfide, from 0% to 32% by volume carbon dioxide, and from 100% to 5% by volume methane was calculated for individual feed streams (power generated from burning $H_2S$ minus power required to separate $H_2S$ and $CO_2$ from the feed stream) to be 173 MW, at 90%, 389 MW, at 80%, 666 MW, at 70%, 1036 MW, at 60%, 1555 MW, at 50%, 2233 MW, at 40%, 3629 MW, at 30%, 6221 MW, at 20%, 13996 MW, at 10%, and 29549 MW, at 5% methane. The amount of power generated when producing liquefied natural gas from 10 million metric tons of natural gas produced from a feed gas having from 0% to 63% by volume of hydrogen sulfide, from 0% to 32% by volume carbon dioxide, and from 100% to 5% by volume methane was calculated for individual feed streams (power generated from burning $H_2S$ minus power consumed to separate $H_2S$ and $CO_2$ from the feed gas stream and to liquefy natural gas) to be 11 MW, at 80%, 288 MW, at 70%, 658 MW, at 60%, 1177 MW, at 50%, 1855 MW, at 40%, 2251 MW, at 30%, 5843 MW, at 20%, 13618 MW, at 10%, and 74037 MW, at 5% methane. The amount of power generated when producing liquefied natural gas from 10 million tons of natural gas produced from a feed gas having from 0% to 63% by volume of hydrogen sulfide, from 0% to 32% by volume carbon dioxide, and from 100% to 5% by volume methane and for producing a liquefied carbon dioxide stream from the carbon dioxide in the feed gas was calculated for individual feed streams (power generated from burning $H_2S$ minus power consumed to separate $H_2S$ and $CO_2$ from the feed gas stream and power consumed to liquefy natural gas and power consumed to liquefy the $CO_2$) to be 239 MWt at 70%, 581 MWt at 60%, 1060 MWt at 50%, 1779 MWt at 40%, 2977 MWt at 30%, 5374 MWt at 20%, 12652 MWt at 10% and 26940 MWt at 5% methane.

The data in Examples 23 to 33 demonstrate capturing all the thermal power from combustion of a hydrogen sulfide stream, produced from a feed gas stream containing hydrogen sulfide and carbon dioxide with the balance being hydrocarbons, may generate all of the thermal and/or mechanical power required for separating the feed gas stream into a the hydrogen sulfide stream, a hydrocarbon gas stream, and a carbon dioxide stream and also produce sufficient thermal and/or electrical and/or mechanical power for processing the hydrocarbon gas stream to produce LNG and to produce liquid carbon dioxide. Significant power for export as mechanical or electrical power may be generated as the volume of hydrogen sulfide in the feed gas stream exceeds 20 vol. %.

Comparative Examples 34 to 44

In a process model using process steps in accordance with the production of LNG using a conventional Claus process, power calculations for the production of 10 million metric tons of natural gas containing from 0% to 63% by volume of hydrogen sulfide, from 0% to 32% by volume carbon dioxide, and from 100% to 5% by volume methane were performed using energy consumption data obtained from known refinery process. In the process model, the feed gas stream was treated to separate water and liquid hydrocarbons from the feed gas stream. Next, hydrogen sulfide and carbon dioxide were removed from the feed gas stream using an amine extraction system. In the process model, the thermal power required to regenerate the hydrogen sulfide/carbon dioxide loaded amine system was supplied as steam produced from Claus Process heat recovery unit(s) and operation of a supplemental boiler that was fueled by natural gas produced in the process. The boiler was assumed to have 100% thermal efficiency. In the process model, hydrogen sulfide produced from regeneration of the amine system was converted to elemental sulfur via the Claus Process. A heating value of 2973 Btu per pound (6915 kilojoule per kilogram) of elemental sulfur produced from the Claus Process was used in the calculations. The heating value for the regeneration of the hydrogen sulfide loaded amine extraction solution of 4030 Btu per pound (9374 kilojoule per kilogram) of hydrogen sulfide produced was used in the calculations. The heating value for the regeneration of the carbon dioxide loaded amine extraction solution of 1513 Btu per pound (1596 kilojoule per kilogram) of carbon dioxide was used in the calculations. A power requirement for carbon dioxide compression, liquefaction, and pumping of 0.11 MW per mT/h was used in the calculations. In the process model, if supplemental power was necessary methane was used as fuel. The consumption of methane was estimated using the lower heating value of 21433 Btu per pound (49820 kilojoule per kilogram) of methane.

TABLE 4 lists power data, LNG production data, elemental sulfur data, and carbon dioxide emission data for the production of LNG from feed gas streams having compositions ranging from 0% to about 63% by volume hydrogen sulfide, from 0% to about 32% by volume carbon dioxide, and from 100% to 5% by volume methane. As shown in TABLE 4, the amount of carbon dioxide emission increases significantly as the amount of methane required for supplemental power is increased for streams that contain higher quantities of hydrogen sulfide and carbon dioxide, and lesser quantities of methane.

By comparing the data in Examples 23 to 33 to the data in Comparative Examples 34 to 44, it is shown that the use of hydrogen sulfide as fuel to power the separation of hydrogen sulfide and carbon dioxide from a feed gas stream to produce natural gas and the subsequent liquefaction of the natural gas to LNG and the subsequent liquefaction of the carbon dioxide yields most, and typically all, of the thermal and/or mechanical power required by those processes and may permit production of electrical power for export. Conventional processes for producing LNG from streams containing significant amounts of hydrogen sulfide and carbon dioxide that utilize the Claus process to form elemental sulfur from hydrogen sulfide, however, always require supplemental combustion of methane and associated emissions of carbon dioxide to meet the overall energy requirements of the process.

TABLE 1

| | Illustrative Example No. | | | | | | | | | | |
|---|---|---|---|---|---|---|---|---|---|---|---|
| | 1 | 2 | 3 | 4 | 5 | 6 | 7 | 8 | 9 | 10 | 11 |
| Volume %, $H_2S$ | 5 | 10 | 20 | 30 | 40 | 50 | 60 | 70 | 80 | 90 | 95 |
| Volume %, $CH_4$ | 95 | 90 | 80 | 70 | 60 | 50 | 40 | 30 | 20 | 10 | 5 |
| LNG Produced, mT/h | 1142 | 1142 | 1142 | 1142 | 1142 | 1142 | 1142 | 1142 | 1142 | 1142 | 1142 |
| Sulfur Dioxide Produced, mT/h | 240 | 507 | 1142 | 1957 | 3044 | 4566 | 6849 | 10654 | 18265 | 41096 | 86758 |
| Power Generated By $H_2S$ Burning, MWt | 540 | 1139 | 2563 | 4394 | 6835 | 10253 | 15380 | 23924 | 41012 | 92278 | 194809 |
| Power Required To Separate $H_2S$, MWt | 322 | 702 | 1579 | 2707 | 4211 | 6317 | 9475 | 14739 | 25267 | 56850 | 120016 |

TABLE 1-continued

| | Illustrative Example No. | | | | | | | | | | |
|---|---|---|---|---|---|---|---|---|---|---|---|
| | 1 | 2 | 3 | 4 | 5 | 6 | 7 | 8 | 9 | 10 | 11 |
| Power Required To Make LNG, MW | 378 | 378 | 378 | 378 | 378 | 378 | 378 | 378 | 378 | 378 | 378 |
| Excess Power Produced After Making LNG, MWt | 0 | 60 | 607 | 1309 | 2247 | 3559 | 5527 | 8808 | 15368 | 35051 | 74415 |
| Power Export at 40% Efficiency After Making LNG, MWe | 0 | 24 | 243 | 524 | 899 | 1424 | 2211 | 3523 | 6147 | 14020 | 29766 |
| Power Export at 60% Efficiency After Making LNG, MWe | 0 | 36 | 364 | 786 | 1348 | 2135 | 3316 | 5285 | 9221 | 21030 | 44649 |
| Power Exported After Making LNG, kWh/kg $H_2S$ | 0 | 0.2 | 1.0 | 1.3 | 1.4 | 1.5 | 1.5 | 1.6 | 1.6 | 1.6 | 1.6 |
| Supplemental Power Required, MW | 171 | 0 | 0 | 0 | 0 | 0 | 0 | 0 | 0 | 0 | 0 |
| Carbon Dioxide Emitted, mT/h | 95 | 0 | 0 | 0 | 0 | 0 | 0 | 0 | 0 | 0 | 0 |

TABLE 2

| | Comparative Example No. | | | | | | | | | | |
|---|---|---|---|---|---|---|---|---|---|---|---|
| | 12 | 13 | 14 | 15 | 16 | 17 | 18 | 19 | 20 | 21 | 22 |
| Volume %, $H_2S$ | 0 | 10 | 20 | 30 | 40 | 50 | 60 | 70 | 80 | 90 | 95 |
| Volume %, $CH_4$ | 100 | 90 | 80 | 70 | 60 | 50 | 40 | 30 | 20 | 10 | 5 |
| LNG Produced, mT/h | 1142 | 1142 | 1142 | 1142 | 1142 | 1142 | 1142 | 1142 | 1142 | 1142 | 1142 |
| Elemental Sulfur Produced, mT/h | 0 | 254 | 571 | 978 | 1522 | 2283 | 3425 | 5327 | 9132 | 20548 | 43379 |
| Power Generated By Claus Plant, MWt | 0 | 487 | 1096 | 1879 | 2922 | 4383 | 6575 | 10228 | 17534 | 39451 | 83285 |
| Power Required To Separate $H_2S$, MWt | 0 | 702 | 1579 | 2707 | 4211 | 6317 | 9475 | 14739 | 25267 | 56850 | 120016 |
| Power Required To Make LNG, MW | 378 | 378 | 378 | 378 | 378 | 378 | 378 | 378 | 378 | 378 | 378 |
| Supplemental Power Required, MW | 378 | 592 | 861 | 1206 | 1666 | 2311 | 3277 | 4888 | 8110 | 17777 | 37109 |
| Methane for Supplemental Power, mT/h | 27 | 43 | 62 | 87 | 120 | 167 | 237 | 353 | 586 | 1284 | 2681 |
| Carbon Dioxide Emitted, mT/h | 75 | 118 | 171 | 240 | 331 | 459 | 651 | 971 | 1611 | 3532 | 7373 |

TABLE 3

| | Illustrative Example No. | | | | | | | | | | |
|---|---|---|---|---|---|---|---|---|---|---|---|
| | 23 | 24 | 25 | 26 | 27 | 28 | 29 | 30 | 31 | 32 | 33 |
| Volume %, $H_2S$ | 0 | 6.6 | 13.2 | 19.8 | 26.4 | 33 | 39.6 | 46.2 | 52.8 | 59.4 | 62.7 |
| Volume %, $CO_2$ | 0 | 3.4 | 6.8 | 10.2 | 13.6 | 17 | 20.4 | 23.8 | 27.2 | 30.6 | 32.3 |
| Volume %, $CH_4$ | 100 | 90 | 80 | 70 | 60 | 50 | 40 | 30 | 20 | 10 | 5 |
| LNG Produced, mT/h | 1142 | 1142 | 1142 | 1142 | 1142 | 1142 | 1142 | 1142 | 1142 | 1142 | 1142 |
| Sulfur Dioxide Produced, mT/h | 0 | 335 | 753 | 1292 | 2009 | 3014 | 4521 | 7032 | 12055 | 27123 | 57260 |
| Carbon Dioxide Produced, mT/h | 0 | 119 | 267 | 457 | 712 | 1067 | 1601 | 2490 | 4269 | 9606 | 20280 |
| Power Generated by $H_2S$ Burning, MWt | 0 | 752 | 1692 | 2900 | 4511 | 6767 | 10151 | 15790 | 27068 | 60903 | 128574 |
| Power Required To Separate $H_2S$ and $CO_2$, MWt | 0 | 579 | 1303 | 2234 | 3475 | 5212 | 7818 | 12161 | 20847 | 46907 | 99025 |
| Power Required To Make LNG, MW | 378 | 378 | 378 | 378 | 378 | 378 | 378 | 378 | 378 | 378 | 378 |
| Power Required To Liquefy $CO_2$, MW | 0 | 13 | 29 | 50 | 78 | 117 | 176 | 274 | 470 | 1057 | 2231 |
| Supplemental Power Required, MW | 378 | 218 | 18 | 0 | 0 | 0 | 0 | 0 | 0 | 0 | 0 |
| Methane Required For Supplemental Power, mT/h | 27 | 16 | 1 | 0 | 0 | 0 | 0 | 0 | 0 | 0 | 0 |
| Excess Power After Making LNG, MWt | 0 | 0 | 0 | 239 | 581 | 1060 | 1779 | 2977 | 5374 | 12562 | 26940 |
| Power Export at 40% Efficiency After Making LNG, MWe | 0 | 0 | 0 | 95 | 232 | 424 | 712 | 1191 | 2149 | 5025 | 10776 |
| Power Export at 60% Efficiency, After Making LNG, MWe | 0 | 0 | 0 | 143 | 349 | 636 | 1067 | 1786 | 3224 | 7537 | 16164 |
| Power Export After Making LNG, kWh/Kg $H_2S$ | 0 | 0 | 0 | 0.35 | 0.54 | 0.66 | 0.74 | 0.80 | 0.84 | 0.87 | 0.89 |

TABLE 3-continued

| | Illustrative Example No. | | | | | | | | | | |
|---|---|---|---|---|---|---|---|---|---|---|---|
| | 23 | 24 | 25 | 26 | 27 | 28 | 29 | 30 | 31 | 32 | 33 |
| Carbon Dioxide Emitted, mT/h | 75 | 43 | 3 | 0 | 0 | 0 | 0 | 0 | 0 | 0 | 0 |
| Carbon Dioxide Captured, % | | 73 | 95 | >95 | >95 | >95 | >95 | >95 | >95 | >95 | >95 |

TABLE 4

| | Comparative Example No. | | | | | | | | | | |
|---|---|---|---|---|---|---|---|---|---|---|---|
| | 34 | 35 | 36 | 37 | 38 | 39 | 40 | 41 | 42 | 43 | 44 |
| Volume %, $H_2S$ | 0 | 6.6 | 13.2 | 19.8 | 26.4 | 33 | 39.6 | 46.2 | 52.8 | 59.4 | 62.7 |
| Volume %, $CO_2$ | 0 | 3.4 | 6.8 | 10.2 | 13.6 | 17 | 20.4 | 23.8 | 27.2 | 30.6 | 32.3 |
| Volume %, $CH_4$ | 100 | 90 | 80 | 70 | 60 | 50 | 40 | 30 | 20 | 10 | 5 |
| LNG Produced, mT/h | 1142 | 1142 | 1142 | 1142 | 1142 | 1142 | 1142 | 1142 | 1142 | 1142 | 1142 |
| Elemental Sulfur Produced, mT/h | 0 | 167 | 377 | 646 | 1005 | 1507 | 2260 | 3516 | 6027 | 13562 | 28630 |
| Power Generated by Claus Plant, MWt | 0 | 321 | 723 | 1240 | 1929 | 2893 | 4340 | 6750 | 11572 | 26037 | 54968 |
| Power Required To Separate $H_2S$ and $CO_2$, MWt | 0 | 579 | 1302 | 2234 | 3475 | 5212 | 7818 | 12161 | 20847 | 46907 | 99025 |
| Power Required To Make LNG, MW | 378 | 378 | 378 | 378 | 378 | 378 | 378 | 378 | 378 | 378 | 378 |
| Supplemental Power Required, MW | 0 | 635 | 957 | 1371 | 1923 | 2696 | 3856 | 5788 | 9653 | 21247 | 44435 |
| Methane Required for Supplemental Power, mT/h | 27 | 46 | 69 | 99 | 139 | 195 | 279 | 418 | 697 | 1535 | 3210 |
| Total Carbon Dioxide Emitted, mT/h | 75 | 245 | 457 | 730 | 1094 | 1603 | 2367 | 3640 | 6187 | 13828 | 29108 |

The present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. Whenever a numerical range with a lower limit and an upper limit is disclosed, any number and any included range falling within the range is specifically disclosed. In particular, every range of values (of the form, "from a to b," or, equivalently, "from a-b") disclosed herein is to be understood to set forth every number and range encompassed within the broader range of values. Whenever a numerical range having a specific lower limit only, a specific upper limit only, or a specific upper limit and a specific lower limit is disclosed, the range also includes any numerical value "about" the specified lower limit and/or the specified upper limit. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces.

What is claimed is:

1. A method of producing sulfur dioxide, comprising:
providing a feed gas stream comprising hydrogen sulfide and hydrocarbons, wherein the feed gas stream comprises at least 5% by volume hydrogen sulfide;
separating at least a portion of the feed gas stream into a hydrogen sulfide stream and a hydrocarbon gas stream, the hydrogen sulfide stream containing more hydrogen sulfide, by volume percent, than the feed gas stream, and the hydrocarbon gas stream containing less hydrogen sulfide, by volume percent, than the feed gas stream;
providing an oxidant stream in an amount sufficient to provide at least 1.5 moles of molecular oxygen per 1 mole of hydrogen sulfide in the hydrogen sulfide stream;
combusting essentially all of the hydrogen sulfide stream with at least a portion of the oxidant stream to generate thermal power and to produce a combustion stream comprising sulfur dioxide and steam; and
separating at least a portion of the sulfur dioxide from the combustion stream.

2. The method of claim 1 wherein separating at least a portion of the sulfur dioxide from the combustion stream comprises cooling and at least partially dehydrating the combustion stream.

3. The method of claim 2 wherein the combustion stream is cooled to a temperature ranging from −5° C. to 85° C.

4. The method of claim 1 wherein separating at least a portion of the sulfur dioxide from the combustion stream comprises cooling the combustion stream and contacting the cooled combustion stream with concentrated sulfuric acid.

5. The method of claim 1 further comprising contacting at least a portion of the separated sulfur dioxide with air in the presence of a catalyst to produce sulfur trioxide; and contacting at least a portion of the sulfur trioxide with water to produce sulfuric acid.

6. The method of claim 1 further comprising providing at least a portion of the separated sulfur dioxide and/or a portion of the combustion stream to a subsurface hydrocarbon formation.

7. The method of claim 1 wherein at least a portion of the thermal power generated by combustion of the hydrogen sulfide stream is converted to electrical power.

8. The method of claim 7 wherein at least a portion of the electrical power is provided for sale or for use in an electrical consumption unit.

9. The method of claim 8 wherein the electrical consumption unit is a power grid, or a smelter, or a server farm.

10. The method of claim 8 wherein the electrical consumption unit is located on or near a body of water.

11. The method of claim 1 wherein at least a portion of the thermal power generated by combustion of the hydrogen sulfide stream is converted to mechanical power.

12. The method of claim 1 further comprising the step of processing the hydrocarbon gas stream to produce natural gas.

13. The method of claim 1 further comprising the step of processing the hydrocarbon gas stream to produce a liquefied natural gas.

\* \* \* \* \*